US007554065B2

(12) United States Patent
Shimizu

(10) Patent No.: US 7,554,065 B2
(45) Date of Patent: Jun. 30, 2009

(54) ILLUMINANCE SENSOR DETERMINING THE DUTY RATIO OF A PWM SIGNAL BASED ON A DIGITAL OUTPUT OF AN A/D CONVERTER AND LIGHT CONTROL APPARATUS

(75) Inventor: Takayuki Shimizu, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 0 days.

(21) Appl. No.: 12/022,028

(22) Filed: Jan. 29, 2008

(65) Prior Publication Data

US 2008/0179498 A1 Jul. 31, 2008

(30) Foreign Application Priority Data

Jan. 31, 2007 (JP) ............................ 2007-022305

(51) Int. Cl.
*G01J 1/32* (2006.01)

(52) U.S. Cl. .................................. 250/205; 250/214.1

(58) Field of Classification Search ................ 250/205, 250/208.1, 214.1, 214 R, 214 DC; 345/102
See application file for complete search history.

(56) References Cited

U.S. PATENT DOCUMENTS

2004/0069931 A1 * 4/2004 Stam et al. ............... 250/208.1
2005/0057484 A1 * 3/2005 Diefenbaugh et al. ....... 345/102
2005/0276080 A1 * 12/2005 Okada ......................... 363/41
2006/0151678 A1 7/2006 Shibata

FOREIGN PATENT DOCUMENTS

| | | | |
|---|---|---|---|
| JP | 63-309826 | | 12/1988 |
| JP | 3-21829 | A | 1/1991 |
| JP | 09-145468 | A | 6/1997 |
| JP | 10-023335 | | 1/1998 |
| JP | 10-142047 | A | 5/1998 |
| JP | 2004-022646 | A | 1/2004 |
| JP | 2004-233569 | A | 8/2004 |
| JP | 2006-194612 | A | 7/2006 |

* cited by examiner

*Primary Examiner*—Thanh X Luu
*Assistant Examiner*—Francis M Legasse, Jr.
(74) *Attorney, Agent, or Firm*—Birch, Stewart, Kolasch & Birch, LLP

(57) ABSTRACT

The following members are included: a light receiving element which outputs an electric signal corresponding to ambient light; an A/D converter which converts the electric signal output from the light receiving element into a digital signal; a register which stores the digital signal output from the A/D converter and determines the duty ratio of a PWM signal based on the digital signal; and a PWM controller which outputs the PWM signal based on the duty ratio output from the register.

12 Claims, 14 Drawing Sheets

FIG. 9

| EXPLANATION OF FUNCTION OF REGISTER | | SYMBOL | DATA | | | | | | | |
|---|---|---|---|---|---|---|---|---|---|---|
| | | | D7 | D6 | D5 | D4 | D3 | D2 | D1 | D0 |
| ILLUMINANCE | | ADO | ADO[7] | ADO[6] | ADO[5] | ADO[4] | ADO[3] | ADO[2] | ADO[1] | ADO[0] |
| ILLUMINANCE LEVEL 0 | DARK | OPT0 | OPT0[7] | OPT0[6] | OPT0[5] | OPT0[4] | OPT0[3] | OPT0[2] | OPT0[1] | OPT0[0] |
| ILLUMINANCE LEVEL 1 | ↑ | OPT1 | OPT1[7] | OPT1[6] | OPT1[5] | OPT1[4] | OPT1[3] | OPT1[2] | OPT1[1] | OPT1[0] |
| ILLUMINANCE LEVEL 2 | | OPT2 | OPT2[7] | OPT2[6] | OPT2[5] | OPT2[4] | OPT2[3] | OPT2[2] | OPT2[1] | OPT2[0] |
| ILLUMINANCE LEVEL 3 | | OPT3 | OPT3[7] | OPT3[6] | OPT3[5] | OPT3[4] | OPT3[3] | OPT3[2] | OPT3[1] | OPT3[0] |
| ILLUMINANCE LEVEL 4 | | OPT4 | OPT4[7] | OPT4[6] | OPT4[5] | OPT4[4] | OPT4[3] | OPT4[2] | OPT4[1] | OPT4[0] |
| ILLUMINANCE LEVEL 5 | | OPT5 | OPT5[7] | OPT5[6] | OPT5[5] | OPT5[4] | OPT5[3] | OPT5[2] | OPT5[1] | OPT5[0] |
| ILLUMINANCE LEVEL 6 | | OPT6 | OPT6[7] | OPT6[6] | OPT6[5] | OPT6[4] | OPT6[3] | OPT6[2] | OPT6[1] | OPT6[0] |
| ILLUMINANCE LEVEL 7 | | OPT7 | OPT7[7] | OPT7[6] | OPT7[5] | OPT7[4] | OPT7[3] | OPT7[2] | OPT7[1] | OPT7[0] |
| ILLUMINANCE LEVEL 8 | | OPT8 | OPT8[7] | OPT8[6] | OPT8[5] | OPT8[4] | OPT8[3] | OPT8[2] | OPT8[1] | OPT8[0] |
| ILLUMINANCE LEVEL 9 | | OPT9 | OPT9[7] | OPT9[6] | OPT9[5] | OPT9[4] | OPT9[3] | OPT9[2] | OPT9[1] | OPT9[0] |
| ILLUMINANCE LEVEL 10 | | OPT10 | OPT10[7] | OPT10[6] | OPT10[5] | OPT10[4] | OPT10[3] | OPT10[2] | OPT10[1] | OPT10[0] |
| ILLUMINANCE LEVEL 11 | | OPT11 | OPT11[7] | OPT11[6] | OPT11[5] | OPT11[4] | OPT11[3] | OPT11[2] | OPT11[1] | OPT11[0] |
| ILLUMINANCE LEVEL 12 | | OPT12 | OPT12[7] | OPT12[6] | OPT12[5] | OPT12[4] | OPT12[3] | OPT12[2] | OPT12[1] | OPT12[0] |
| ILLUMINANCE LEVEL 13 | | OPT13 | OPT13[7] | OPT13[6] | OPT13[5] | OPT13[4] | OPT13[3] | OPT13[2] | OPT13[1] | OPT13[0] |
| ILLUMINANCE LEVEL 14 | ↓ | OPT14 | OPT14[7] | OPT14[6] | OPT14[5] | OPT14[4] | OPT14[3] | OPT14[2] | OPT14[1] | OPT14[0] |
| ILLUMINANCE LEVEL 15 | BRIGHT | OPT15 | OPT15[7] | OPT15[6] | OPT15[5] | OPT15[4] | OPT15[3] | OPT15[2] | OPT15[1] | OPT15[0] |
| SETTING OF DUTY VARIATION OVER TIME | | SLOPE | UPSL[3] | UPSL[2] | UPSL[1] | UPSL[0] | DWSL[3] | DWSL[2] | DWSL[1] | DWSL[0] |
| DUTY WHEN AUTOMATIC LIGHT CONTROL | | DUTY0 | DUTY[7] | DUTY[6] | DUTY[5] | DUTY[4] | DUTY[3] | DUTY[2] | DUTY[1] | DUTY[0] |

ILLUMINANCE SENSOR DETERMINING THE DUTY RATIO OF A PWM SIGNAL BASED ON A DIGITAL OUTPUT OF AN A/D CONVERTER AND LIGHT CONTROL APPARATUS

This Nonprovisional application claims priority under 35 U.S.C. § 119(a) on Patent Application No. 022305/2007 filed in Japan on Jan. 31, 2007, the entire contents of which are hereby incorporated by reference.

FIELD OF THE INVENTION

The present invention relates to a light sensor circuit and a light receiving module, which convert the illuminance of visible light into an electric signal, and particularly relates to an illuminance sensor achieving spectral sensitivity characteristics close to human visual properties and also relates to a light control apparatus including the illuminance sensor.

BACKGROUND OF THE INVENTION

There has been a rapid increase in demand of illuminance sensors having properties close to human visual properties, in order to restrain the drain on battery power of mobile phones or increase the visibility of liquid crystal display, by automatically adjusting the brightness of the backlight of mobile phones and liquid crystal television sets in accordance with ambient light.

Also, because of digitalization and advance of illuminance sensors, there has been a demand of easy-to-use and low-cost illuminance sensors for liquid crystal backlight automatic light adjustment systems.

Representative examples of visible light sensors are silicon photodiodes and CdS (cadmium sulfide) cells.

Silicon photodiodes are widely used for optical communications, light receiving elements for optical discs, and optical sensors, because of the small size, high-speed response, and stability.

However, being significantly different from those of humans, the spectral sensitivity characteristics of silicon photodiodes are sensitive to infrared light. To arrange the silicon photodiodes to have the spectral sensitivity characteristics close to those of humans, it is necessary to include a circuit and a visibility correction filter in order to adjust the spectral sensitivity characteristics.

On the other hand, on account of its spectral sensitivity characteristics close to those of humans, CdS cells have long been used as exposure meters of cameras and visible light sensors.

However, the use of CdS cells, which are mainly made of cadmium sulfide, has gradually been restricted these days, in consideration of environmental burdens. Since July 2006, it has been prohibited to bring products using at least one of cadmium, lead, hexavalent chromium, and mercury into Europe. Because of this, there has been an increase in the demand of sensors which are made of environmentally-friendly silicon photodiodes, having spectral sensitivity characteristics close to those of humans.

For example, Japanese Laid-Open Patent Application No. 10-142047 (published on May 29, 1998) teaches as follows: plural photodiodes are included in an illuminance sensor, light entering from a light receiving window is separated by a shielding plate provided between neighboring photodiodes, and illuminance is detected in each of plural regions. Because of this arrangement, the illuminance distribution is precisely detected even if intense light locally enters.

Japanese Laid-Open Patent Application No. 9-145468 (published on Jun. 6, 1997) teaches that illuminance data used for quickly responding to a change in room illuminance is generated from the previously-output illuminance data and detected illuminance data. This arrangement reduces an amount of stored illuminance data, at the same time improve the response to a change in illuminance.

Japanese Laid-Open Patent Application No. 2004-22646 (published on Jan. 22, 2004) teaches that, ambient brightness detected by a photo transistor is obtained as an illuminance level, and white LEDs are driven in accordance with the duty ratio of a PWM signal corresponding to the illuminance level.

Japanese Laid-Open Patent Application No. 2004-233569 (published on Aug. 19, 2004) teaches a technique to circumvent an influence of a noise from an LED power source circuit, when ambient illuminance is detected. In this technique, when illuminance is detected by an illuminance level detection circuit, a sensor power source circuit is turned on while an LED power source circuit is turned off, so that a noise of the LED power source circuit is circumvented.

The above-described arrangements, however, are disadvantageous in that signals from the illuminance sensor are susceptible to noise when illuminance is low, and an apparatus for adjusting light bears a burden of processing the signals from the illuminance sensor.

FIG. 15 is a block diagram showing a conventional light control apparatus. This light control apparatus is arranged such that, to allow an analog output illuminance sensor 510 to output, in accordance with the illuminance, a voltage or current analog signal having spectral sensitivity characteristics close to human visibility, (1) an output of an illuminance sensor is sampled, (2) the output is converted into a digital signal for controlling a light emitting apparatus, such as a PWM signal, and (3) light is controlled by controlling the light emitting apparatus such as LED.

In the conventional art shown in FIG. 15, after converting an analog signal output from the analog output illuminance sensor 510 into a digital signal by an A/D converter, a CPU 520 performs computation so that a PWM signal corresponding to the illuminance is generated. The PWM signal is input to a PWM modulation terminal of a general-purpose LED driver 530, with the result that light from an LED backlight or the like is automatically controlled.

In the scheme shown in FIG. 15, the computing apparatus (CPU 520) is required to always sample outputs from the analog output illuminance sensor 510 so as to perform computation. The CPU 520 must therefore bear a burden, and this may cause an adverse effect on the execution speed of other applications. A CPU dedicated to automatic light control may be additionally provided to avoid such a performance problem of the CPU 520, but this drives up costs.

When the illuminance is low, the output level of the analog output illuminance sensor 510 is also low. Therefore the analog output illuminance sensor 510 is susceptible to noise when a line between the analog output illuminance sensor 510 and the CPU 520 is long.

There is another known scheme shown in FIG. 16, which is arranged such that a digital-output illuminance sensor 510*a* is adopted and the illuminance sensor and the CPU are connected by a serial interface such as $I^2C$, so that illuminance information is sent and received as digital signals. This scheme is advantageous in that an influence of noise is restrained because illuminance information is transmitted between the digital-output illuminance sensor 510*a* and the CPU 520, in the form of digital signals.

However, being similar to the scheme shown in FIG. 15, the CPU 520 is required to always monitor the illuminance. Therefore the problem of the burden on the CPU 520 is unsolved. Also in this case, a CPU dedicated to automatic light control may be additionally provided to avoid the performance problem of the CPU 520, but this drives up costs.

Japanese: Laid-Open Patent Application No. 2004-22646 (published on Jan. 22, 2004) teaches that, an LED driver includes an A/D converter or the like and hence analog signals output from an analog output illuminance sensor are converted into digital signals, computation is then suitably carried out and LED currents are adjusted in accordance with the illuminance, so that light from an LED backlight or the like is automatically controlled.

FIG. 17 is a block diagram showing the LED driver disclosed by Japanese Laid-Open Patent Application No. 2004-22646 (published on Jan. 22, 2004). This LED driver can be alternatively represented by the block diagram in FIG. 18.

In the scheme illustrated in FIG. 17 and FIG. 18, a high-performance LED driver 530*a* includes an A/D converter or the like as discussed above, and hence LED currents are adjusted in accordance with the illuminance so that light is controlled. In this arrangement, the CPU 520 and the high-performance LED driver 530*a* are connected by a serial interface such as $I^2C$. It is therefore possible to determine the initial setting of the high-performance LED driver 530*a*, at the time of power on.

In the arrangement shown in FIG. 17 and FIG. 18, the CPU 520 is required to only determine the initial setting of members such as a register of the high-performance LED driver 530*a*, at the time of power on or reset. The CPU 520 is therefore not required to always sample illuminance information. On this account, the scheme makes it possible to construct an automatic light control system without lowering the performance of the CPU 520.

In the scheme above, however, since the most of the functions concerning the light control are performed by the high-performance LED driver 530*a*, the high-performance LED driver 530*a* must be custom-build for each type of the analog output illuminance sensors 510 and each type of light control applications. Because of this lack of versatility, the LED driver is costly.

The scheme is also disadvantageous in that, because the analog output illuminance sensor 510 outputs illuminance information as analog signals, a noise influence is not negligible when the illuminance is low.

To reduce a noise influence on signals from an illuminance sensor, Japanese Laid-Open Patent Application No. 2004-233569 (published on Aug. 19, 2004) teaches that, when an illuminance level detection circuit detects illuminance, a sensor power source circuit is turned on while an LED power source circuit is turned off, in order to avoid an influence of a noise from the LED power source circuit. This scheme, however, is disadvantageous in that light may flicker because power supply to LEDs stops each time the illuminance level is detected.

There is a case where an illuminance sensor is arranged to detect the illuminance of plural areas as taught in Japanese Laid-Open Patent Application No. 10-142047 (published on May 29, 1998). Also in this case, signals from the illuminance sensor are susceptible to a noise when the illuminance is low, and hence an apparatus for light control is required to bear a burden of processing of the signals from the illuminance sensor.

SUMMARY OF THE INVENTION

The present invention was done to solve the problem above, and the objective of the present invention is to provide an illuminance sensor and a light control apparatus, (i) which are not susceptible to noise even when the luminance is low, (ii) in which processes for illuminance control do not influence on computation performed by the light control apparatus, and (iii) excel in versatility.

To achieve the objective above, the illuminance sensor of the present invention includes: light receiving means for outputting an electric signal corresponding to ambient brightness; A/D conversion means for converting the electric signal output from the light receiving means into a digital signal; duty ratio determination means including an illuminance register storing the digital signal output from the A/D conversion means and duty ratio registers storing a duty ratio which is output based on a value of the illuminance register, the duty ratio determination means determining the duty ratio of a PWM signal based on the digital signal output from the A/D conversion means; and PWM signal output means for outputting the PWM signal based on the duty ratio output from the duty ratio determination means.

Also, to achieve the objective above, the light control apparatus of the present invention preferably includes the illuminance sensor above.

In the arrangement above, the illuminance sensor of the present invention is arranged such that the A/D conversion means outputs a digital signal in accordance with the ambient brightness detected by the light receiving means. The duty ratio is determined based on this digital signal, and the duty ratio is output as a PWM signal.

It is therefore possible to construct a light control apparatus such as an automatic backlight control system only by combining the above-described illuminance sensor with a general-purpose LED driver.

BRIEF DESCRIPTION OF THE DRAWINGS

FIG. 9 is a table which relates to the embodiment of the light control apparatus of the present invention, and which shows a register map stored in the register 114 of FIG. 1.

DESCRIPTION OF THE EMBODIMENTS

The following will explain an embodiment of the present invention with reference to FIGS. 1-14.

Figure 2:
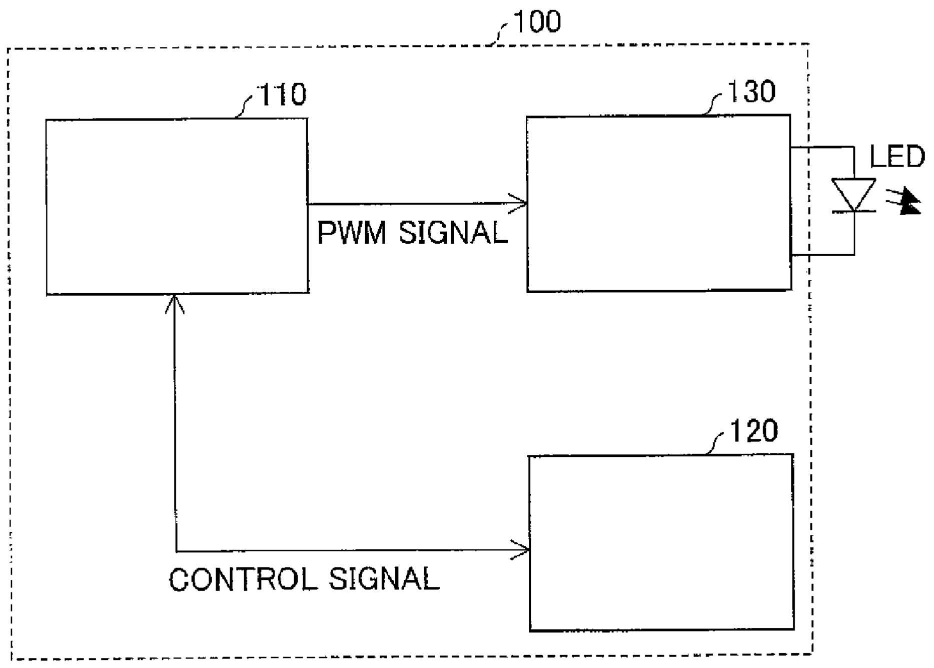
FIG. 2 is a block diagram showing an embodiment of a liquid control device including the illuminance sensor shown in FIG. 1.

FIG. 2 is a block diagram showing a light control apparatus 100 of the present embodiment. The light control apparatus 100 of the present embodiment includes an illuminance sensor 110 outputting a PWM (Pulse Width Modulation) signal, a computing apparatus (CPU 120) constituted by a microcomputer, and a general-purpose LED driver 130. The illuminance sensor 110 is electrically connected to the general-purpose LED driver 130. Also, the illuminance sensor 110 is electrically connected to the CPU 120.

The illuminance sensor 110 includes therein a photodiode and a signal processing circuit which processes electric signals output from a photodiode, and outputs a PWM signal in accordance with ambient brightness. The PWM signal thus output may be a typical PWM signal which will be discussed later. On account of this arrangement, a PWM signal output from the illuminance sensor 110 can be directly input to a PWM modulation terminal of the general-purpose LED driver 130. In other words, a light control apparatus such as an automatic backlight control system can be constructed by only combining the illuminance sensor 110 of the present embodiment with the general-purpose LED driver 130, without requiring the intervention of the CPU 120.

Also, the light control apparatus 100 of the present embodiment includes a CPU 120 electrically connected to the illuminance sensor 110. The CPU 120 is used for performing the initial setting of the illuminance sensor 110 of the present embodiment, at the time of power on, resetting, and the like. In the initial setting, for example, a value of a register in the illuminance sensor 110 is determined.

In the light control apparatus 100 of the present embodiment the CPU 120 is not required to always monitor the illuminance, as explained above. The performance of the CPU 120 is therefore not deteriorated while the illuminance is monitored.

In the present embodiment, a PWM signal output from the illuminance sensor 110 is supplied to the general-purpose LED driver 130, and light control of LEDs is carried out. The general-purpose LED driver 130 includes a PWM modulation terminal, and causes the LEDs to emit light by supplying the aforesaid PWM signal thereto. Since, in the present embodiment, the PWM signal may be a standard PWM signal, it is also possible to control the brightness of light emitting apparatus other than LEDs, such as cold-cathode tubes.

Figure 3:
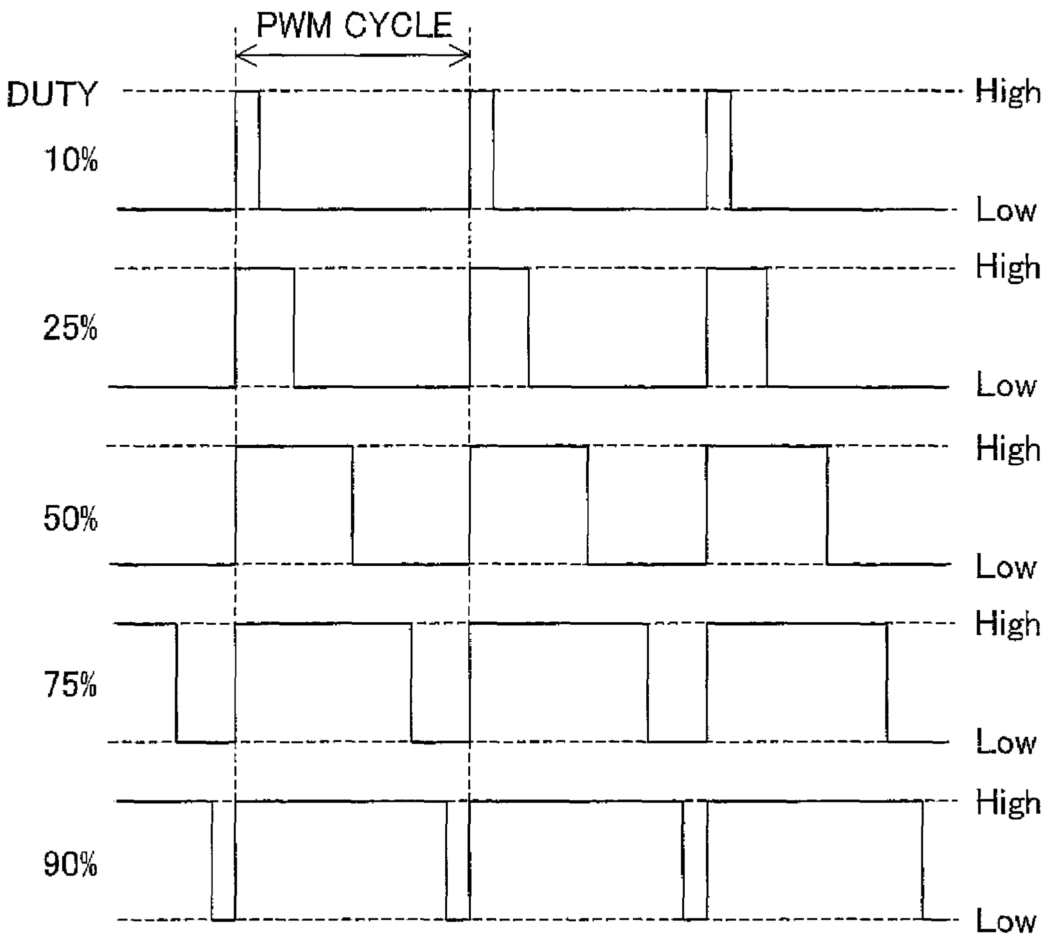
FIG. 3 is an waveform chart relating to the embodiment of the light control apparatus of the present invention, and showing the waveform of a PWM signal generated by the PWM controller shown in FIG. 2.

FIG. 3 is an waveform chart showing an example of the PWM signal of the present embodiment. The PWM signal is determined by a PWM cycle and a DUTY ratio. The PWM cycle can be set for each light control apparatus 100 and is unique to each apparatus. The DUTY ratio indicates how an apparatus controlled by the PWM signal operates. For example, when DUTY=0%, the output signal is always at Low level. On the other hand, when DUTY=100%, the output signal is always at High level. When DUTY is set at a value between 0% and 100%, the DUTY (DUTY ratio) is determined by: (a time during which the signal is at High level/a PWM cycle). In the example shown in FIG. 3, the ratio of the time during which the signal is at High level becomes longer as the DUTY increases.

In the present embodiment, the LEDs are switched on while the PWM output is at High level, whereas the LEDs are switched off while the PWM output is at Low level. In this way, the brightness of LEDs of the backlight or the like is controlled in proportion to the DUTY.

It is noted that the brightness control by PWM is feasible in almost all types of general-purpose LED drivers and cold-cathode tube drivers. For this reason, the brightness of the light emitted from a light emitting apparatus can be controlled to be in proportion to the DUTY, by using the PWM signal output from the illuminance sensor 110 of the present embodiment.

Figure 1:
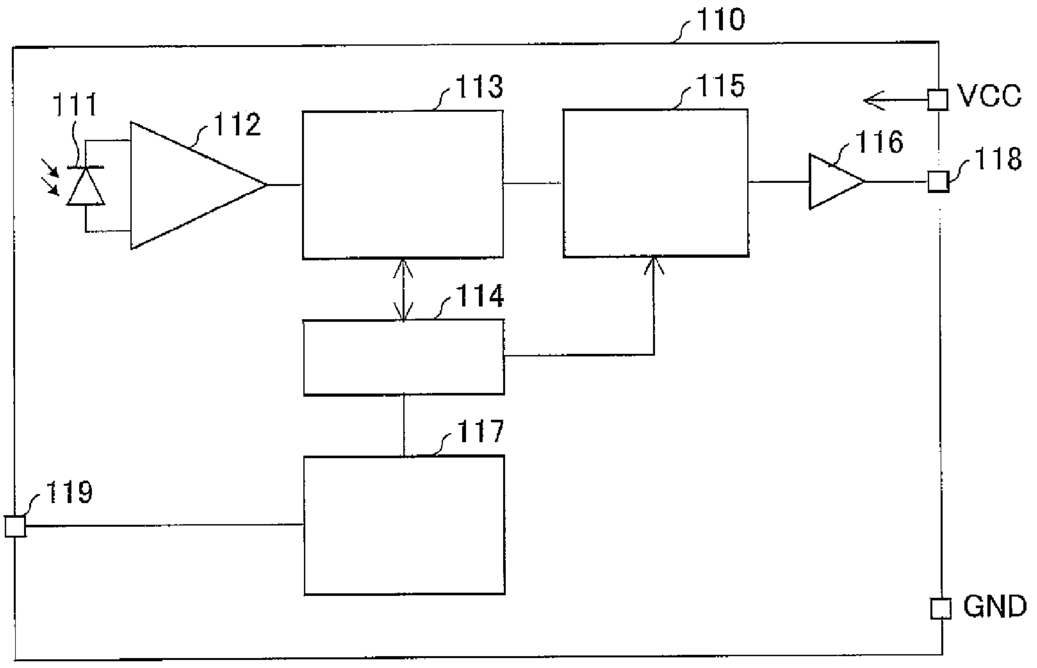
FIG. 1 is a block diagram which relates to an embodiment of a light control apparatus of the present invention and which shows an illuminance sensor.

FIG. 1 is a block diagram showing the illuminance sensor 110 of the present embodiment.

The illuminance sensor 110 of the present embodiment includes a light receiving element 111, an I-V amplifier 112, an A/D converter 113, a register 114, a PWM controller 115, a buffer 116, and a serial interface 117. The light receiving element 111 is electrically connected to the I-V amplifier 112, the I-V amplifier 112 is electrically connected to the A/D converter 113, the A/D converter 113 is electrically connected to the register 114, the register 114 is electrically connected to the PWM controller 115, and the PWM controller 115 is electrically connected to the buffer 116. Also, the register 114 is electrically connected to the serial interface 117, and also to the CPU 120 via a serial connection terminal 119 which is electrically connected to the serial interface 117. Furthermore, the buffer 116 is electrically connected to the PWM output terminal 118.

The light receiving element 111 generates a photocurrent in proportion to an externally-incoming light amount. In the illuminance sensor 110 of the present embodiment, the light receiving element 111 is preferably constituted by a photodiode or a phototransistor, but may be constituted by another light receiving element. The photocurrent which is an analogue signal and has been generated by the light receiving element 111 is converted from current to voltage by the I-V amplifier 112, and then converted to a digital signal by the A/D converter 113. After the conversion to the digital signal, the illuminance data is stored in the register 114 to indicate current illuminance, and is used for allowing the PWM controller 115 to control the PWM signal.

The register 114 also stores the DUTY of a PWM signal corresponding to illuminance data. Since the DUTY is stored as a register map (mentioned later) in the register 114, it is possible to optionally determine the DUTY of the PWM signal corresponding to the illuminance.

The PWM controller 115 grasps the current illuminance with reference to the illuminance data stored in the register 114, and generates a PWM signal based on the illuminance and the DUTY of the PWM signal stored in the register 114. This PWM signal thus generated is output via the buffer 116 and the PWM output terminal 118.

As such, in the illuminance sensor 110 of the present embodiment, the illuminance data measured by the light receiving element 111 is amplified by the I-V amplifier 112, and then converted into a digital signal by the A/D converter 113. Therefore an influence of an external noise is restrained.

The illuminance sensor 110 of the present embodiment may be arranged as an OPIC (Optical IC, registered trademark) in which the signal processing circuits such as the light receiving element 111, the I-V amplifier 112, the A/D converter 113, register 114, the PWM controller 115, and the buffer 116 are integrated on a single silicon chip. This arrangement is advantageous in that the line between the light receiving element 111 and the I-V amplifier 112 is short. In other words, a faint photocurrent output from the light receiving element 111 when the illuminance is low is not susceptible to an external noise.

It is noted that the register 114 is connected to the CPU 120 via the serial interface 117 compliant to a standard such as $I^2C$ and the serial connection terminal 119. It is therefore possible to configure, from the outside of the illuminance sensor 110, the register map by which the DUTY of the PWM signal is set.

Also, the illuminance data stored in the register 114 may be read out to the outside via the serial interface 117. With this, the CPU 120 is allowed to perform complex light control with reference to the illuminance information stored in the register 114.

Figure 4:
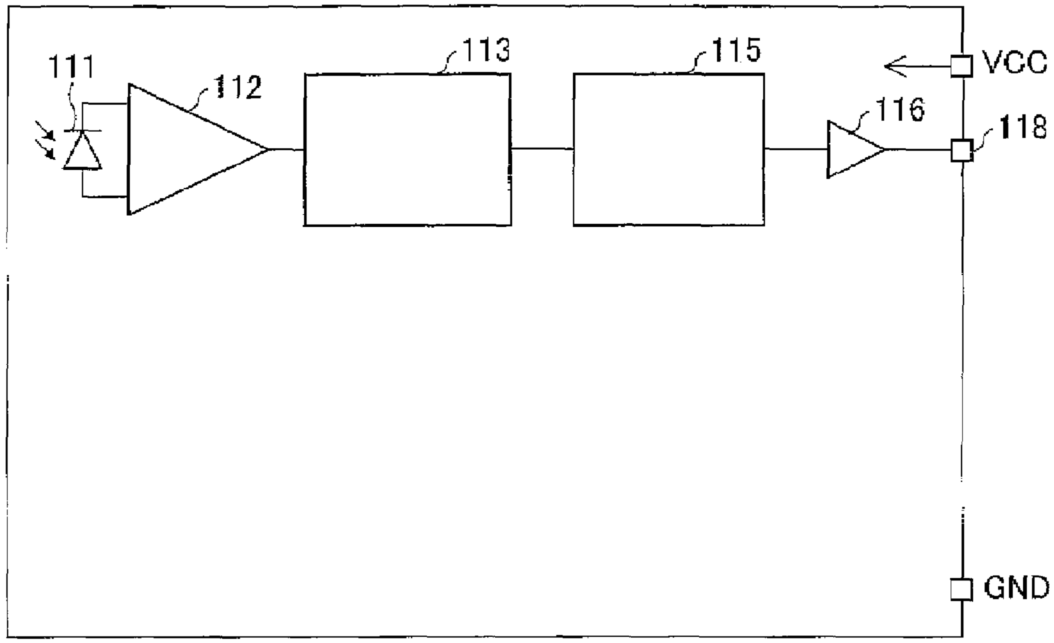
FIG. 4 is a block diagram which relates to another embodiment of a light control apparatus of the present invention and which shows an alternative arrangement of the illuminance sensor of FIG. 1.

In case where the DUTY is fixed at a predetermined value, it is possible to adopt a scheme shown in FIG. 4, which is arranged such that illuminance data is directly supplied from the A/D converter 113 to the PWM controller 115 without the intermediary of the register 114, and a PWM signal is then output.

Figure 5:
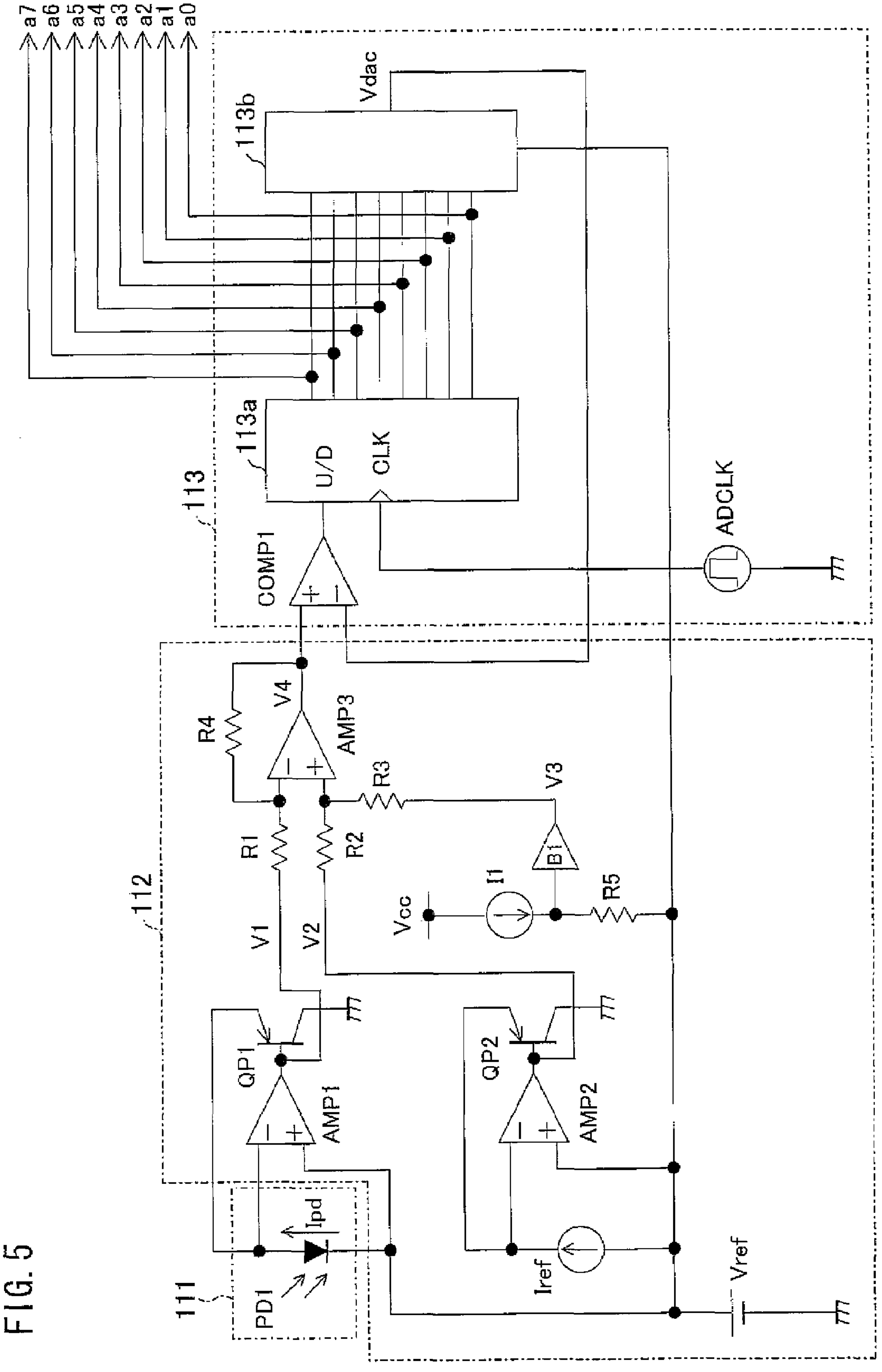
FIG. 5 is a block diagram which relates to the embodiment of the light control apparatus of the present invention, and which shows the light receiving element, I-V amplifier, and A/D converter of FIG. 1.

FIG. 5 is a block diagram showing the light receiving element 111, the I-V amplifier 112, and the A/D converter 113 of the illuminance sensor 110 of the present embodiment.

A photodiode PD1 constituting the light receiving element 111 generates a photocurrent Ipd in proportion to externally-incident light. The photocurrent Ipd is converted to a voltage which is logarithmic-compressed by a logarithmic compression amplifier which is constituted by (i) a PN-junction diode between the emitter and base of a PNP transistor QP1 constituting the I-V amplifier 112 and (ii) an AMP1.

This logarithmic compression amplifier is arranged in such a manner that the cathode terminal of the photodiode PD1 is connected to the positive terminal of a voltage source Vref and is electrically connected to the positive terminal of the AMP1, the anode terminal of the PD 1 is electrically connected to the negative terminal of the AMP1 and to the emitter terminal of the PNP transistor QP1. Furthermore, the base terminal of the PNP transistor QP1 is electrically connected to the output terminal of the AMP1, and the collector of the PNP transistor QP1 is electrically grounded. Because of this arrangement, an output voltage V1 of this logarithmic compression amplifier is represented by the following equation.

$$V1 = Vref - Vt \times \ln(Ipd/Is)$$

where:

Vt: k×T/q (thermal voltage)

k: Boltzmann constant

T: absolute temperature q: elementary charge

Is: inverted saturation current

To correct the temperature characteristics of the photodiode PD1, the current source of a reference current Iref is constructed so as to cause the temperature coefficient of the reference current Iref to be equal to the temperature coefficient of the photocurrent Ipd output from the photodiode PD1. For the construction of the current source of the reference current Iref, a diode thermal-joined with the photodiode PD1 may be used, for example. The current source of the reference current Iref may be constructed in another way. Being similar to the photocurrent Ipd, the reference current Iref is converted into a logarithmic-compressed voltage by a logarithmic compression amplifier which is constituted by (i) a PN-junction diode between the emitter and base of a PNP transistor QP2 and (ii) an AMP2. Therefore, an output voltage from the logarithmic compression amplifier for the reference current Iref is represented by the following equation.

$$V2 = Vref - Vt \times \ln(Iref/Is)$$

The output voltage V1 is added to the output voltage V2 by an adder-subtracter circuit. The adder-subtracter circuit may be constituted by an AMP3 and plural resistors R1-R4. In the present embodiment, the negative terminal of the AMP3 is electrically connected to the output terminal of the AMP1 via the resistor R1, and also to the output terminal of the AMP3 via the resistor R4. Furthermore, the positive terminal of the AMP3 is electrically connected to the output terminal of the AMP2, via the resistor R2. Also, the positive terminal of the voltage source Vref is connected to one end of the resistor R5 and the other end of the resistor R5 is connected to a constant current source I1, and hence the resistor R5 is controlled so that a constant current flows therein. To the both ends of the resistor R5, a voltage A×Vt which is calculated by multiplying the thermal voltage Vt by a constant is applied. Therefore the terminal voltage at the junction between the resistor R5 and the constant current source I1 is Vref+A·Vt, this voltage is supplied to one end of the resistor R3 via the buffer amplifier B1, and the other end of the resistor R3 is connected to the positive terminal of the AMP3. On this account, the offset voltage of the voltage source V3 is arranged to be Vref+A×Vt.

Provided that the resistors R1-R4 have the same resistance R, an output voltage V4 of the adder-subtracter circuit is represented as follows.

$$\begin{aligned} V4 &= -V1 + V2 + V3 \\ &= -(Vref - Vt \times \ln(Ipd/Is)) + (Vref - Vt \times \ln(Iref/Is)) + \\ &\quad (Vref - A \times Vt) \\ &= Vref + Vt \times (A + \ln(Ipd/Iref)) \end{aligned}$$

In this manner, the term of the temperature-dependant inverted saturation current Is is cancelled.

Then this equation of the output voltage V4 is converted to a relational expression indicating the relation with illuminance (lux).

Provided that a photocurrent flowing in the photodiode PD1 of the light receiving element 111 when the illuminance is 1 lux is Ipd__1lx, the output voltage V4 can be represented by the following equation.

$$\begin{aligned} V4 &= Vref + Vt \times (A + \ln(Ipd/\text{Ipd\_1}1x) + \ln(\text{Ipd\_1}1x/Iref)) \\ &= Vref + Vt \times (A + \ln(Ev) + \ln(\text{Ipd\_1}1x/Iref)) \\ &= Vref + Vt \times (A - \ln(Iref/\text{Ipd\_1}1x) + 2.3025(Ev)) \end{aligned}$$

In this equation, the following expression to convert the base of the logarithm is used.

$$\ln(X) = \log(X)/\log(e) \approx 2.3025 \times \log(X)$$

As the constant A is set so as to satisfy A-ln(Iref/Ipd__1lx)=0, the output voltage V4 is represented as follows.

$$V4 = Vref + 2.3025 \times Vt \times \log(Ev)$$

In this manner, a voltage corresponding to the logarithm of the illuminance.

That is, the equation above can be transformed into:

$$V4 = Vref + C \times \log(Ev)$$

where:

Ev=illuminance (lux)

In this manner, the I-V amplifier 112 of the present embodiment performs logarithmic compression of the illuminance measured by the light receiving element 111. Since the measured illuminance is logarithmic-compressed, the dynamic range of the measurement of the illuminance is widened and hence the range of the measurement covers low illuminance to high illuminance. Furthermore, the resolution at the time of low illuminance is high as compared to a case of direct A/D conversion of an output current of the light receiving element 111.

The following will describe how the A/D converter 113 of the present embodiment is arranged.

The A/D converter 113 of the present embodiment includes a comparator COMP1, an illuminance level updown counter 113*a*, and a D/A converter 113*b*.

The logarithmic-compressed analog signal output from the I-V amplifier 112 is input to the positive terminal of the comparator COMP1. The negative terminal of the comparator COMP1 is electrically connected to the Vdac terminal of the D/A converter 113*b*. The output terminal of the comparator COMP1 is electrically connected to the illuminance level updown counter 113*a*. The illuminance level updown counter 113*a* of the present embodiment is at 8-bit precision, and receives a clock ADCLK for A/D conversion. Then the analog signal output from the I-V amplifier 112 is converted to a digital signal, in sync with the clock ADCLK. The illuminance level updown counter 113*a* is electrically connected to the register 114 and the D/A converter 113*b*. The digital signal output from the illuminance level updown counter 113*a* is output, as 8-bit digital signals a0-a7; to the register 114 and the D/A converter 113*b*. The register 114 stores the digital signals which are output as illuminance data.

The D/A converter 113*b* reconverts the supplied digital signals into an analog signal as discussed below, and outputs, as an output voltage Vdac, the analog signal to the comparator COMP1. As explained below, in the D/A converter 113*b* of the present embodiment, the output voltage Vdac is represented as follows.

$$Vdac=Vref+B\times Vt$$

where:

B: a variable which varies with 8-bit precision

As explained below, the variable B is arranged to increase in proportion to an output value of a digital signal. It is therefore possible to adopt an arrangement such that the output from the comparator COMP1 is at High level if the output voltage V4 is larger than the output voltage Vdac, as a result of a comparison therebetween. In this case, in sync with the ADCLK which is the clock signal for A/D conversion, the illuminance level updown counter 113*a* counts up.

On the other hand, if V4<Vdac, the output from the comparator COMP1 is at Low level. In this case, the illuminance level updown counter 113*a* counts down in sync with the clock ADCLK.

More specifically, the 8-bit digital signal output from the illuminance level updown counter 113*a* is input to the D/A converter 113*b*, so that feedback is performed in such a way as to equalize the output voltage Vdac of the D/A converter 113*b* with the output voltage V4. Since the digital signal input to the D/A converter 113*b* is at 8 bits (256 gray scales), the variable B is changeable with the precision of 256 gray scales (8 bits) for the full range. Furthermore, the cycle for the counting can be changed by the clock ADCLK. In other words, the response speed of the illuminance sensor 110 of the present embodiment is adjustable.

In the A/D converter 113 of the present embodiment, a digital signal which is output when the output voltage V4 is equal to the output voltage Vdac is constant. Therefore, the variable B is represented as follows.

$$V4=Vdac$$

$$Vref+2.3025\times Vt\times\log(Ev)=Vref+B\times Vt$$

This can be rewritten as follows.

$$B=2.3025\times\log(Ev)$$

In the A/D converter 113 of the present embodiment, as described above, the term of the thermal voltage Vt and the term of the voltage source Vref, which are included in the output voltage V4 of the logarithmic amplifier constituted by the I-V amplifier 112, are cancelled. This indicates that the variable B which changes with the precision of 256 grayscales (8 bits) is arranged not to include the values of the thermal voltage Vt and the voltage source Vref. The A/D converter 113 of the present embodiment outputs a digital signal with the precision of 8 bits, in accordance with the variable B. It is therefore possible to perform A/D conversion of a logarithmic compression illuminance signal, with small temperature dependency.

The following will describe the D/A converter 113*b* of the present embodiment.

Figure 6:
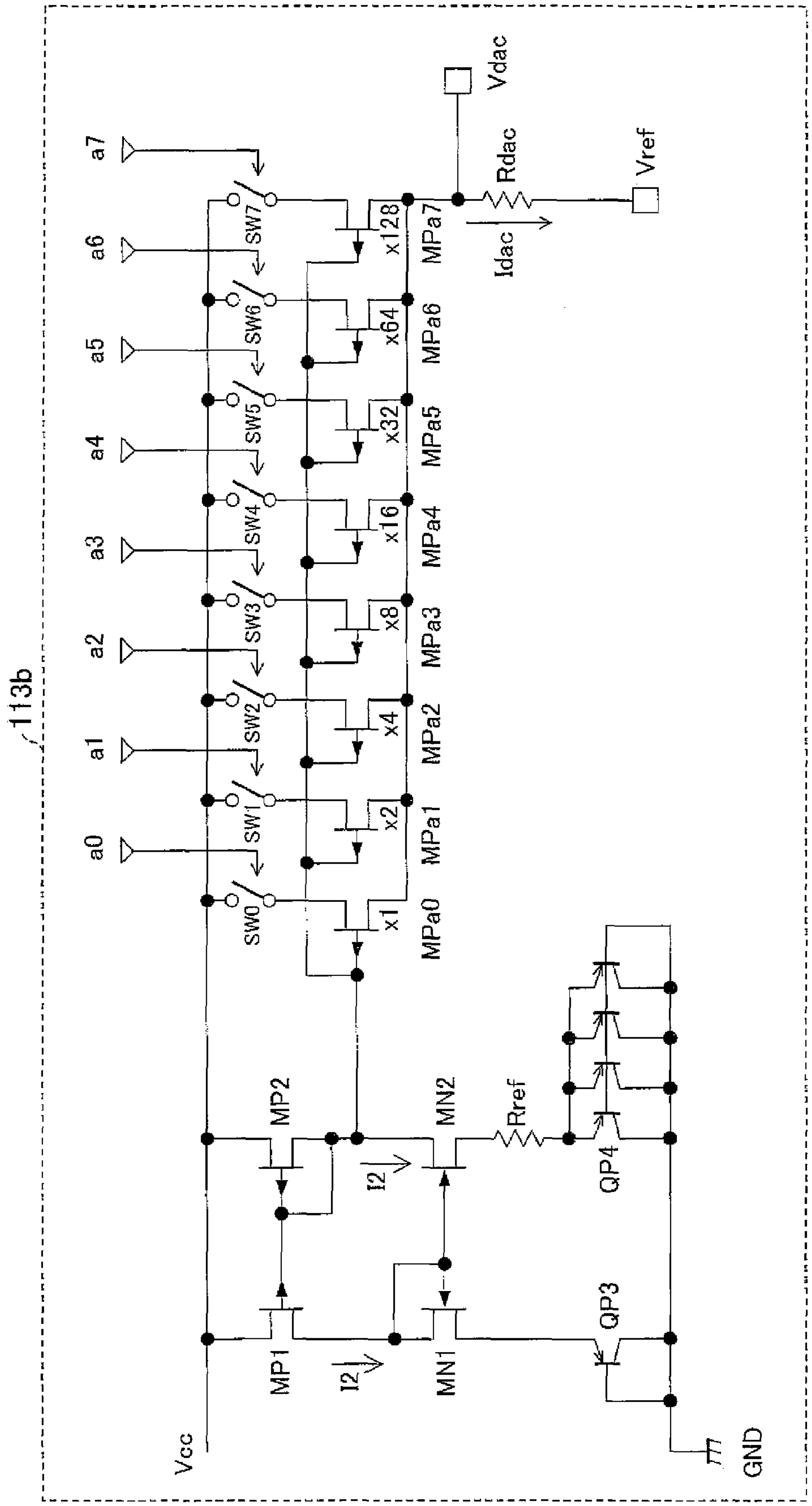
FIG. 6 is a block diagram which relates to the embodiment of the light control apparatus of the present invention, and which shows the D-A converter to FIG. 5.

FIG. 6 is a circuit diagram of the D/A converter 113*b* of the present embodiment;

In the D/A converter 113*b* of the present embodiment, the voltage source Vcc is electrically connected to the source terminals of the MP1 and MP2 which are p-channel PETs, and the gate terminals of the MP1 and MP2 are electrically connected to each other and are connected to the drain terminal of the MP2. The drain terminal of the MP1 is electrically connected to the drain terminal of the MN1 which is an n-channel PET, and the drain terminal of the MP2 is connected to the drain terminal of the MN2 which is an n-channel FET. The gate terminals of the MN1 and MN2 are electrically connected to each other and are connected to the drain terminal of the MN1. In short, the FETs constitute a current mirror circuit. Therefore the same currents flow in the MP1 and MP2.

The source terminal of the MN1 is electrically connected to the emitter terminal of the PNP transistor QP3. The base terminal and the collector terminal of the PNP transistor QP3 are electrically grounded. Therefore, provided that the currents flowing into the sources of the MP1 and MP2 are I2, a voltage Vbe1 between the base and emitter of the PNP transistor QP3 is represented as follows.

$$Vbe1=Vt\times\ln(I2/Is)$$

The source terminal of the MN2 is electrically connected to the resistor Rref, and the other end of the Rref is electrically connected to the emitter terminal of the PNP transistor QP4. The PNP transistor QP4 is constituted by a PNP transistor whose emitter area is four times larger than that of the PNP transistor QP1. The base terminal and collector terminal of the PNP transistor QP4 are electrically grounded.

At this point, the voltage Vbe2 between the base and emitter of the PNP transistor QP4 is represented by the following equation.

$$Vbe2=Vt\times\ln(I2/4Is)$$

Because of the above, the voltage difference between the voltages Vbe1 and Vbe2 is equal to the voltages at the both ends of the resistor Rref.

$$Vbe1=Vbe2+I2\times Rref$$

Therefore, the current I2 is represented as follows.

$$I2=Vt\times\ln 4/Rref$$

As discussed above, the D/A converter 113*b* of the present embodiment outputs an output voltage Vdac which varies with the precision of 256 grayscales (8 bits), in response to inputs of a0-a7 which are 8-bit digital signals output from the illuminance level updown counter 113*a*.

In the D/A converter 113*b* of the present embodiment, the gate terminals of the MPa0, MPa1, MPa2, MPa3, MPa4, MPa5, MPa6, and MPa7, which are P-channel MOSFETs, are electrically connected to the drain terminal of the MP2, and the drain terminals thereof are electrically connected to the output terminal of the Vdac and also to one terminal of the resistor Rdac. The other terminal of the resistor Rdac is electrically connected to the voltage source Vref. The source terminals of the MPa0-MPa7 are connected to a voltage source Vcc via respective switches SW0-SW7 which are electrically switchable from the outside. The switches SW0-SW7 are switched on when each of the 8-bit digital signals a0-a7 output from the illuminance level updown counter 113*a* is at High level. The switches SW0-SW7 may be P-channel MOSFETs.

The length of each of the gates MPa0-MPa7 is identical with that of the MP2. The widths of the gates are identical with, twice as long as, four times as long as, eight times as long as, sixteen times as long as, thirty-two times as long as, sixty-four times as long as, and a hundred and twenty-eight times as long as the width of the gate of the MP2, respectively. Therefore, when each of the switches SW0-SW7 is turned on, the MPa0-MPa7 outputs currents corresponding to the respective widths of the gates, to the respective drain terminals.

In the D/A converter 113*b* of the present embodiment, the gate terminals of the MPa0-MPa7 are electrically connected to the drain terminal of the MP2, as discussed above. The drain terminal of the MP2 is electrically connected to the gate terminal of the MP1. Therefore, when the switch SW0 is turned on, the current I2 flows into the gate terminal of the MPa0 which is a P-channel MOSFET having the gate whose width is identical with those of the gates of the MP1 and MP2. Since the widths of the gates of the MPa1-MPa7 are twice as long as, four times four times as long as, eight times as long as, sixteen times as long as, thirty-two times as long as, sixty-four times as long as, and a hundred and twenty-eight times as long as the width of the gate of the MPa0, respectively, currents which are twice as much as, four times four times as much as, eight times as much as, sixteen times as much as, thirty-two times as much as, sixty-four times as much as, and a hundred and twenty-eight times as much as the current I2 flow into the respective gate terminals, when each of the switches SW1-SW7 is turned on.

The drain terminals of the MPa0-MPa7 are electrically connected to the voltage source Vref (Vcc>Vref) via the resistor Rdac. Therefore, the current Idac flowing in the resistor Rdac is represented by the following equation.

$$Idac=(1\times a0+2\times a1+4\times a2+8\times a3+16\times a4+32\times a5+64\times a6+128\times a7)\times I2$$

As discussed above, the current I2 is represented by the following equation.

$$I2=Vt\times\ln 4/Rref$$

Therefore, the voltage Vdac to be output is represented as below.

$$\begin{aligned}Vdac &= Vref + Idac\times Rdac\\ &= Vref + (1\times a0 + 2\times a1 + 4\times a2 + 8\times a3 + 16\times a4 + 32\times a5 + 64\times a6 + 128\times a7)\times I2\times Rdac\\ &= Vref + (1\times a0 + 2\times a1 + 4\times a2 + 8\times a3 + 16\times a4 + 32\times a5 + 64\times a6 + 128\times a7)\times \ln 4\times (Rdac/Rref)\times Vt\end{aligned}$$

When the resistor Rdac and the resistor Rref are constituted by the same type of resistors having the same temperature coefficients, the Vdac is represented as follows.

$$Vdac=Vref+B\times Vt$$

where:

B: a variable which varies with the precision of 8 bits

Since the a0-a7 can represent 256 grayscales (8-bit precision) by combinations of "1" indicating High level and "0" indicating Low level, the variable B is controllable with the precision of 8 bits, as discussed above. Alternatively, it is possible to increase the number of bits controlled by the illuminance level updown counter 113*a* and the D/A converter 113*b*, by further increasing the number of bits output by the illuminance level updown counter 113*a*. The resolution is further improved in this case, because the number of bits to be controlled increases.

Figure 7:
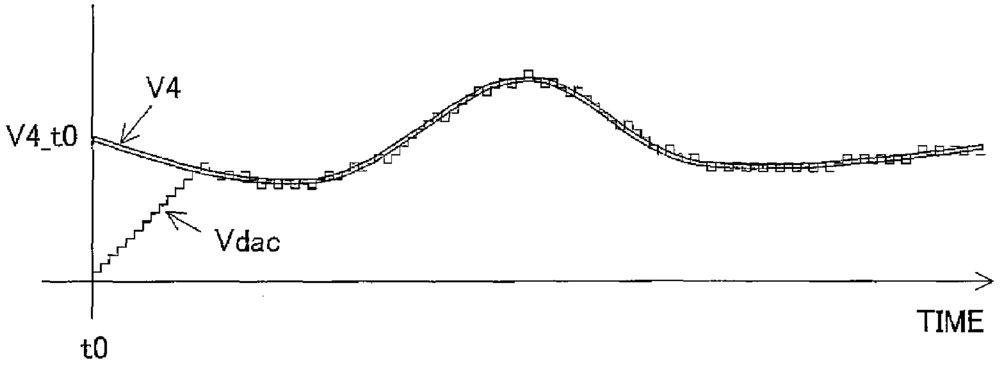
FIG. 7 is a graph which relates to the embodiment of the light control apparatus of the present invention, and which shows the waveforms of signals output from the I-V amplifier and D/A converter of FIG. 5.

FIG. 7 is a graph of a signal on the Vdac when an analog input signal (V4) output from the U-V amplifier 112 of the present embodiment is supplied to the A/D converter 113.

The Vdac signal, which is generated by A/D+D/A conversion of the analog signal V4 by the illuminance level updown counter 113*a* and the D/A converter 113*b*, is fed back in such a manner that the voltages Vdac and V4 are identical with one another, thanks to the comparator COMP1.

For example, when the illuminance level updown counter 113*a* takes an initial value "00000000", in response to an input of an analog signal V4_t0 to the A/D converter 113 at the time t0, the variable B increases in increments of one step in sync with the clock ADCLK and hence the output voltage Vdac increases. Feedback is carried out in such a way that the voltages of V4 and Vdac are identical at the aforesaid time. Since the voltage Vdac which varies with the precision of 8 bits corresponds to the digital signals a0-a7 output from the illuminance level updown counter 113*a*, the digital signals corresponding to the input analog signal (illuminance) are output as the a0-a7. The illuminance data having been converted to the digital signals is stored in the register 114, and the PWM controller 115 at the subsequent stage outputs a PWM signal corresponding to the illuminance level.

The following will describe how the DUTY of a PWM output signal corresponding to an illuminance level is set.

Figure 8:
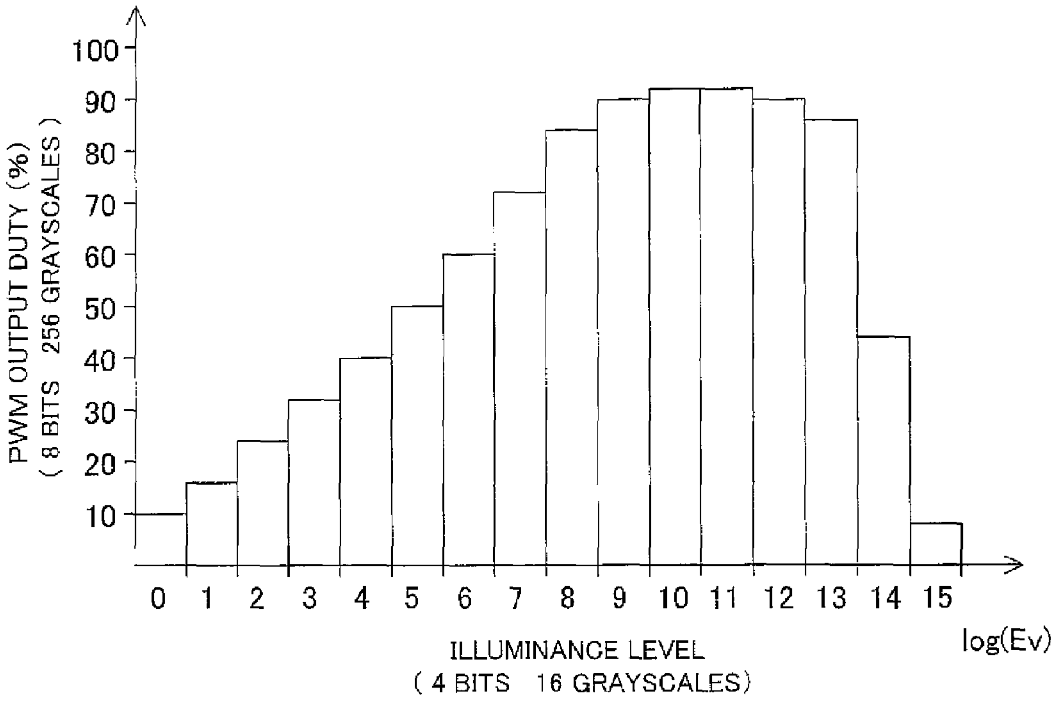
FIG. 8 is a graph which relates to the embodiment of the light control apparatus of the present invention, and which shows a DUTY of a PWM output corresponding to illuminance data output from the A/D converter of FIG. 1.

FIG. 8 is a graph showing how the DUTY for PWM output is controlled in 256 grayscales (8 bits, indicated by the vertical axis), with respect to the 16-grayscale illuminance levels (horizontal axis) corresponding to the upper four bits of illuminance data output from the A/D converter 113. The DUTY is set in the range of 0-100%, in 256 grayscales (8 bits).

In the present embodiment, the DUTY of the PWM signal is in proportion to the brightness of the backlight or the like. Therefore, in the light control table shown in FIG. 8, the brightness of the backlight increases in line with the increase of the illuminance, while the illuminance level is in the range of 0-9. When the illuminance level is within the range of 9-12, the brightness of the backlight is arranged so as not to change so much, even if the illuminance level varies. When the illuminance level is in the range of 12-13, the brightness of the backlight is arranged to decrease as the illuminance increases.

FIG. 9 shows a register map stored in the register 114 of the present embodiment.

The register 114 of the present embodiment includes: an ADO register storing illuminance data output from the A/D converter 113; 16 registers OPT0-OPT15 which set the DUTY in 256 grayscales (8-bit precision) so as to correspond to 16 illuminance levels, respectively; and a SLOPE register which sets a time variation ratio of the DUTY.

The ADO register is arranged so as to reflect illumination data output from the A/D converter 113, in real time.

The registers OPT0-OPT15 are used for associating the illumination levels shown in FIG. 8 with the DUTY, and these registers can be set with the 8-bit precision, in accordance with the respective illuminance levels. As discussed above, since the register 114 is electrically connected to the serial interface 117, values of the registers OPT0-OPT15 can be set from the outside of the illuminance sensor 110 of the present embodiment. Also, illuminance data stored in the register 114 can be read out to the outside via the serial interface 117. In other words, it is possible to allow the CPU 120 to perform complex light control using the illuminance information stored in the register 114.

The SLOPE register is used for setting a time variation ratio of the DUTY. When the brightness of the backlight or the like rapidly changes on account of a rapid change in the illuminance, human eyes may experience discomfort due to flicker in the screen or the like. Taking account of this, the SLOPE register sets the time variation ratio of the DUTY of the PWM output so that the DUTY does not rapidly change even if the illuminance rapidly changes, as shown in the waveform chart in FIG. 10 which illustrates the time-illuminance and time-DUTY.

Figure 10:
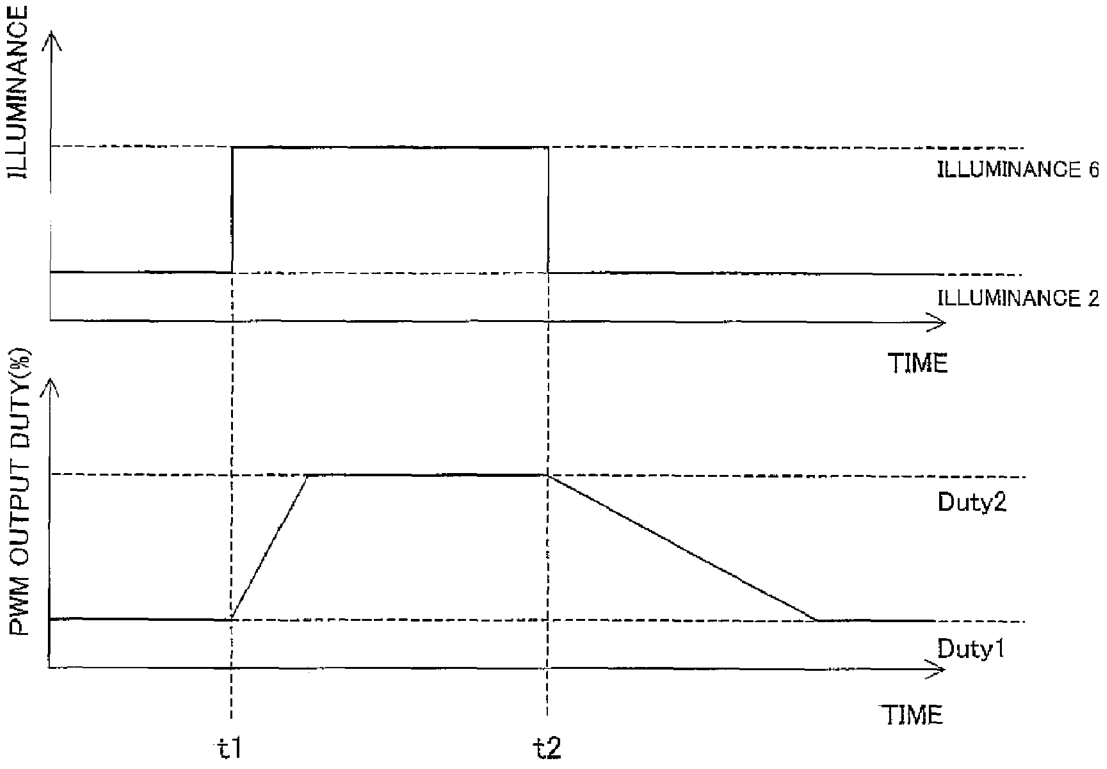
FIG. 10 is an waveform chart which relates to an embodiment of the light control apparatus of the present invention, and which shows how the DUTY of the PWM signal is changed over time by the SLOPE register of FIG. 9.

FIG. 10 shows how the DUTY of the PWM signal changes when the illuminance changes from 2 to 6 at the time t1 and changes from 6 to 2 at the time t2.

Human eyes have characteristics such that, the time for adaptation to a bright place (light adaptation time), when he/she suddenly comes out from a dark place to a bright place, is short, whereas the time for adaptation to a dark place (dart adaptation time), when he/she suddenly enters a dark place from a bright place, is long. Therefore the SLOPE register of the present embodiment changes the setting of the time variation ratio of the DUTY of the PWM signal output, between (i) a change of illuminance from low (dark) to high (bright) and (ii) a change of illuminance from high (bright) to low (dark).

For example, when the illuminance changes from low (dark) to high (bright) and the DUTY of the PWM signal output is increased, as shown in FIG. 9, the time variation ratio of the DUTY is set by using time variation ratios UPSL [0] to UPSL [3] stored in a UPSL register, which ratios correspond to the upper four bits (D4-D7) of the data stored in the SLOPE register of the present embodiment. On the other hand, when the illuminance changes from high (bright) to low (dark) and the DUTY of the PWM signal output is decreased, as shown in FIG. 9, the time variation ratio of the DUTY is set by using time variation ratios DWSL [0] to DWSL [3] stored in a DWSL register, which ratios correspond to the lower four bits (D0-D3) of the data stored in the SLOPE register of the present embodiment. For example, the DUTY corresponding to the target illuminance is multiplied by the time variation ratio thus set, so that the time variation of the DUTY is carried out.

In the example shown in FIG. 10, when the illuminance changes from 2 to 6 at the time t1, the DUTY is controlled so as not to be swiftly changed from DUTY1 corresponding to the illuminance 2 to DUTY2 corresponding to the illuminance 6 but to be changed from DUTY1 to DUTY2 in accordance with the time variation ratio stored in the UPSL register.

Also, when the illuminance changes from 6 to 2 at the time t2, the DUTY is controlled so as not to be swiftly changed from DUTY2 corresponding to the illuminance 6 to DUTY1 corresponding to the illuminance 2, but to be changed from DUTY2 to DUTY1 in accordance with the time variation ratio stored in the DWSL register.

The values of the UPSL register and DWSL register may be optionally set. Alternatively, the values may be set from the outside of the illuminance sensor 110 of the present embodiment, via the serial interface 117.

In this way, smooth automatic light control is achieved.

It may be possible to switch on/off the automatic light control mode by which the aforesaid automatic light control is achieved. Also, a register (DUTY register) may be provided for setting, when the automatic light control mode is turned off, the DUTY which is used for outputting the PWM signal, as shown in FIG. 9.

Some general-purpose LED drivers whose brightness is adjustable by a PWM signal are arranged such that an acceptable frequency range of PWM signals is limited. Therefore the register 114 may be provided with a register, (not illustrated) by which the frequency of the PWM signal is controlled and varied. Providing such a register improves the versatility of the illuminance sensor 110 of the present embodiment.

Figure 11:
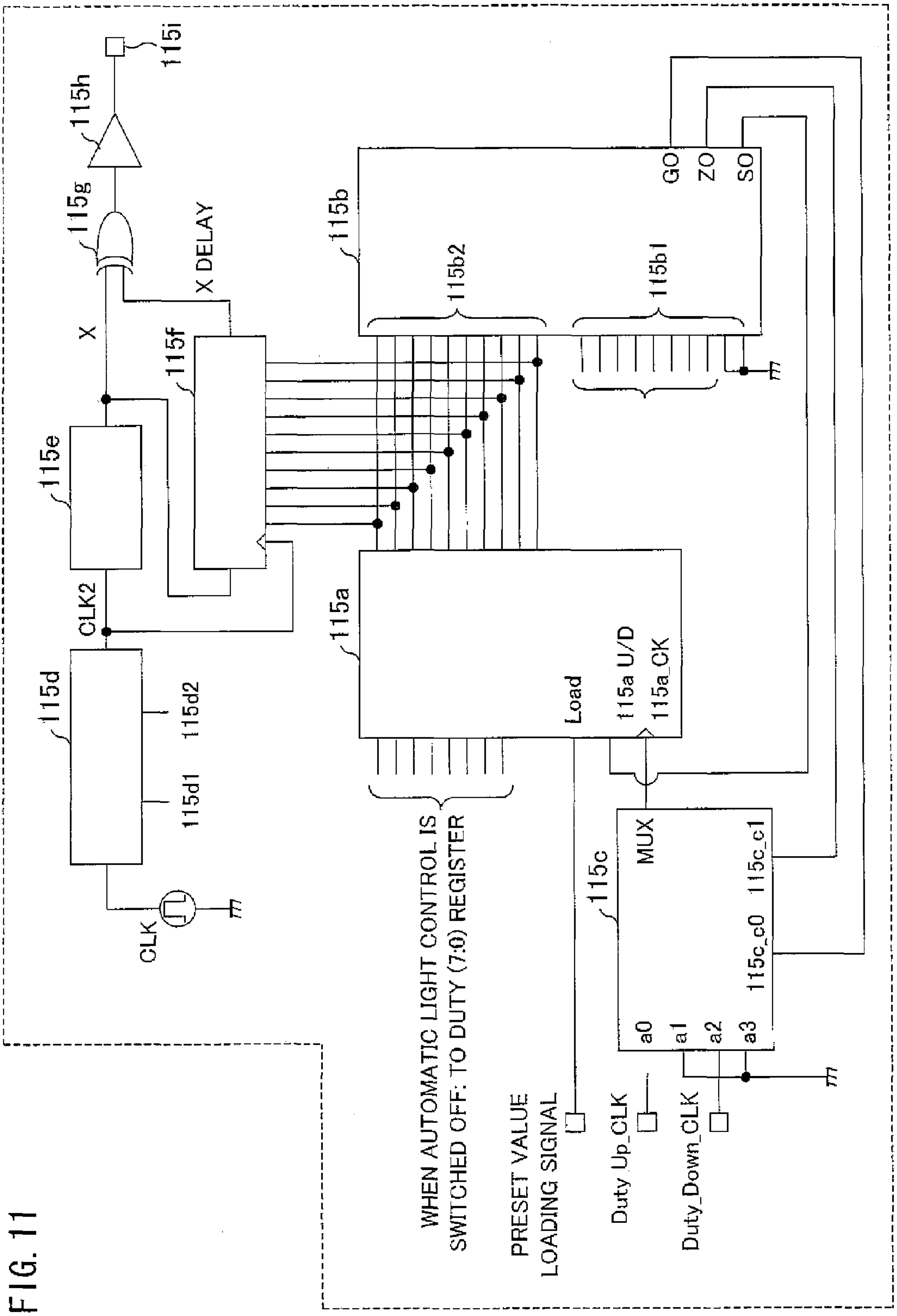
FIG. 11 is a block diagram which relates to the embodiment of the light control apparatus of the present invention, and which shows the PWM controller of FIG. 1.

The following will describe the PWM controller 115 of the present embodiment with reference to FIG. 11.

FIG. 11 is a block diagram showing the PWM controller 115 of the present embodiment.

The PWM controller 115 of the present embodiment includes a PWM updown counter 115*a*, a digital comparator 115*b*, a multiplexer (MUX 115*c*), a programmable prescaler 115*d*, a divider circuit 115*e*, a delay circuit 115*f*, an EXOR circuit 115*g*, a PWM signal buffer 115*h*, and a PWM signal output terminal 115*i*.

In the PWM controller 115 of the present embodiment, in accordance with the 10-bit digital signal which has been set by the PWM updown counter 115*a*, a PWM signal is generated by the programmable prescaler 115*d*, divider circuit 115*e*, delay circuit 115*f*, and EXOR circuit 115*g*. The 10-bit digital signal set by the PWM updown counter 115*a*, which will be explained later, is set by the PWM updown counter 115*a*, digital comparator 115*b*, MUX 115*c*, or the like, based on the DUTY corresponding to the current illuminance level which is read out from the register 114, a 10-bit digital signal which is currently output from the PWM updown counter 115*a*, and the like.

In the PWM controller 115 of the present embodiment, a reference clock (CLK) is input to the programmable prescaler 115*d*. The programmable prescaler 115*d* includes reference clock variable input terminals 115*d*1 and 115*d*2, and hence the programmable prescaler 115*d* can multiply the cycle of the CLK by 1, 2, 4, or 8, by changing a combination of digital signals input to the input terminals. The clock signal modulated by the programmable prescaler 115*d* is output, as a CLK2, to the divider circuit 115*e* and the delay circuit 115*f* which are electrically connected to the programmable prescaler 115*d*.

The cycle of the CLK2 is set so as to be in proportion to the cycle of the PWM signal. This allows the programmable prescaler 115*d* to change the cycle of the PWM signal.

Figure 12:
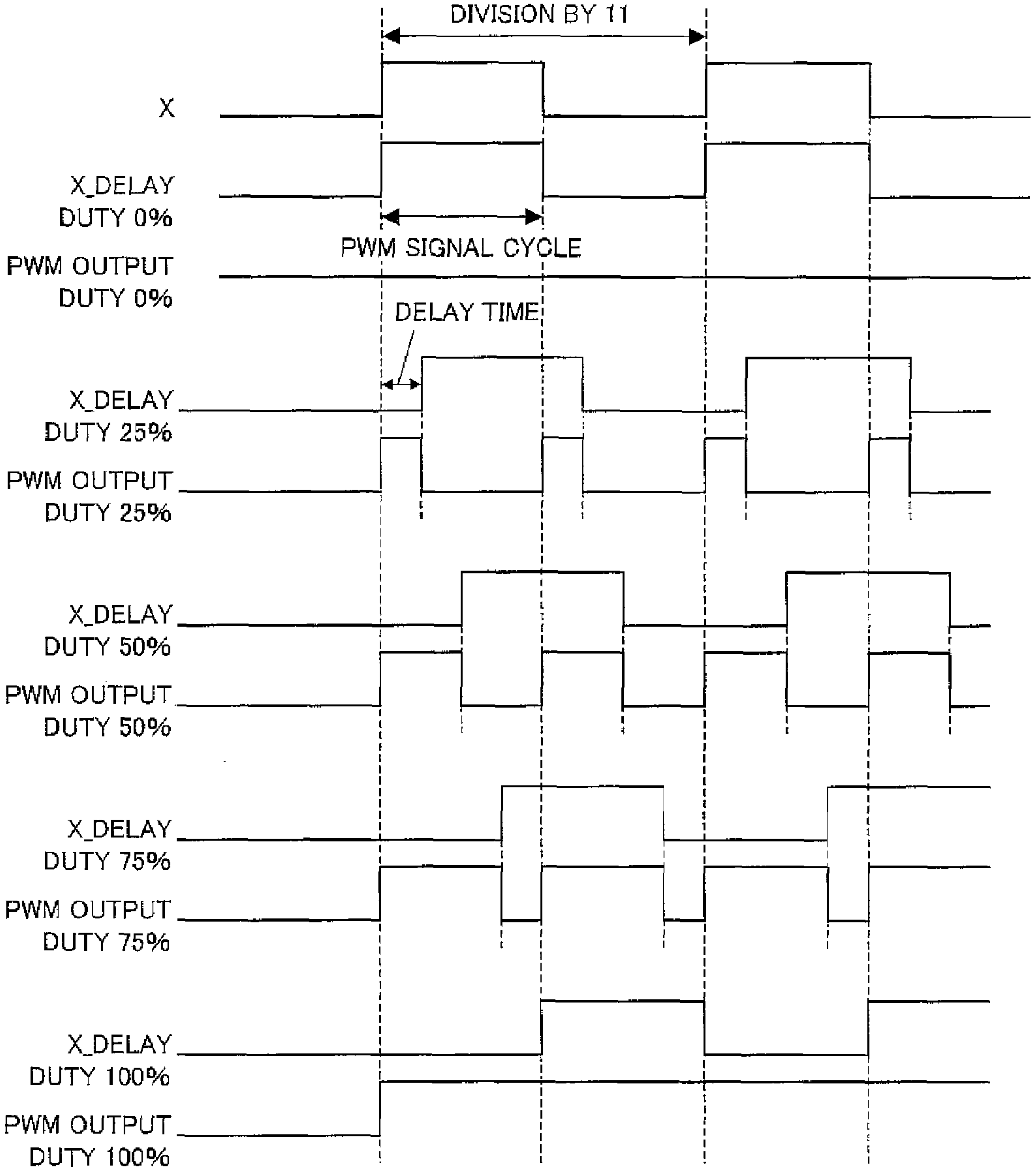
FIG. 12 is an waveform chart which relates to an embodiment of the light control apparatus of the present invention, and which shows a PWM signal generated by the PWM controller of FIG. 11.

The divider circuit 115*e* performs division so as to decrease the cycle of the input CLK2 by a factor of 11. FIG. 12 is an waveform chart showing an output signal generated by the divider circuit 115*e* of the present embodiment. In the present embodiment, the CLK2 is set so that the cycle equivalent to 10/11 of the CLK2 before the division (i.e. the cycle 1024 times longer than the CLK2 after the division) is the cycle of the PWM signal. The divider circuit 115*e* generates a signal X whose cycle is 2048 times longer than the cycle TCLK2 of the signal CLK2 and whose DUTY is 50%.

The divider circuit 115*e* then outputs the signal X to the delay circuit 115*f* and the EXOR circuit 115*g* which are electrically connected to the divider circuit 115*e*.

The delay circuit 115*f* delays the signal X in accordance with a 10-bit digital signal currently output from the PWM updown counter 115*a* and in accordance with the signal CLK2, and outputs the delayed signal X as a signal X_DELAY. The delay time falls within the range of 0 to 1024 times longer than the cycle TCLK2 of the signal CLK2, and the delay time is integral multiple of the length of the TCLK2. The PWM controller 115 of the present embodiment is arranged so that, as discussed above, the degree of the delay of the signal X by the delay circuit 115*f* is large when the DUTY of the PWM signal output from the PWM controller 115 is increased.

In the PWM controller 115 of the present embodiment, the delay circuit 115*f* is electrically connected to the EXOR circuit 115*g*, and hence the delayed signal X_DELAY output from the delay circuit 115*f* is input to the EXOR circuit 115*g*. The EXOR circuit 115*g* performs a logical exclusive disjunction of the signal X input from the divider circuit 115*e* and the signal X_DELAY input from the delay circuit 115*f*. The signal as a result of the logical exclusive disjunction is output, via the PWM signal buffer 115*h* to which the EXOR circuit 115*g* is electrically connected, to the PWM signal output terminal 115*i* to which the PWM signal buffer 115*h* is electrically connected.

The PWM signal output to the PWM signal output terminal 115*i* is set in this way. Therefore the DUTY of the PWM signal increases as the degree of the delay of the signal X by the delay circuit 115*f* increases.

For example, as shown in FIG. 12, in case where the delay circuit 115*f* performs delay which is 0 times as much as the TCLK2, the DUTY of the PWM signal output to the PWM signal output terminal 115*i* is 0%. In case where delay which is 256 times as much as the TCLK2 is performed, the DUTY of the PWM signal output to the PWM signal output terminal 115*i* is 25%.

It is easily understood that delay which is 512 times as much as the TCLK2 results in the DUTY of 50%, delay which is 768 times as much as the TCLK2 results in the DUTY of 75%, and delay which is 1024 times as much as the TCLK2 results in the DUTY of 100%. The relationship between the degrees of signal delay by the delay circuit 115*f* and the DUTY of the PWM signal output to the PWM signal output terminal 115*i* is shown in Table 1.

TABLE 1

| Delay Time (xTCLK2) | DUTY of PWM Signal |
|---|---|
| 0 | 0% |
| 256 | 25% |
| 512 | 50% |
| 768 | 75% |
| 1024 | 100% |

Table 1 shows representative values of the TCLK2. The delay circuit 115*f* can set the delay time of the signal X from 0 to 1024, in units of one cycle of the TCLK2. Therefore the range of 0% to 100% of the DUTY of the PWM signal output to the PWM signal output terminal 115*i* is controllable in 1024 grayscales (0.0977% per step).

In case where the DUTY is digitally varied, a variation of the brightness in each step may be noticeable by human eyes when the DUTY varies in 256 grayscales (0.391% per step). Therefore a variation of the brightness by automatic light control may not be smooth when the grayscale is varied in 256 levels.

To smooth the variation of the brightness, it is necessary to vary the DUTY in 400 grayscales (0.25% per step) or more. Since the PWM controller 115 of the present embodiment performs 10-bit control, the brightness is controllable in 1024 grayscales (0.0977% per step). For this reason, a variation of the brightness by automatic light control appears smooth for the viewer.

The following will describe a 10-bit digital signal supplied from the PWM updown counter 115*a* to the delay circuit 115*f*, with reference to FIG. 11.

In the PWM controller 115 of the present embodiment, the PWM updown counter 115*a*, the digital comparator 115*b*, and the delay circuit 115*f* are electrically connected to one another, and hence a 10-bit digital signal output from the PWM updown counter 115*a* is input to the digital comparator 115*b* and the delay circuit 115*f*. The PWM updown counter 115*a* has an input terminal which is used when the automatic light control mode is switched off and which-receives an initial value of the PWM updown counter 115*a*. Furthermore, the PWM updown counter 115*a* may be electrically connected to the SLOPE register of the register 114, and the counting may be updated with reference to a value of the UPSL register or the DWSL register, when the PWM updown counter 115*a* performs count up or count down. In case where the counting is updated with reference to the value of the SLOPE register, as discussed below, a clock such as Duty_Up_CLK and Duty_Down_CLK, which is used for updating the counting, may be input to the PWM updown counter 115*a*. The PWM updown counter 115*a* is further provided with a terminal for receiving a control signal of the DUTY of the PWM signal, which control signal is output by the digital comparator 115*b* and the MUX 115*c*.

The digital comparator 115*b* includes: a DUTY setting value input terminal 115*b*1 for reading out a DUTY corresponding to a current illuminance level from the register 114; and a DUTY current value input terminal 115*b*2 for receiving a 10-bit digital signal output from the PWM updown counter 115*a*. The 10-bit digital signal input to the DUTY current value input terminal 115*b*2 is input to the delay circuit 115*f*, and this digital signal is used for generating the PWM signal output from the PWM signal output terminal 115*i*, as discussed above.

The digital comparator 115*b* is electrically connected to the MUX 115*c* and the PWM updown counter 115*a*. The digital comparator 115*b* compares the signals input to the DUTY setting value input terminal 115*b*1 and to the DUTY current value input terminal 115*b*2, respectively, and outputs, to the MUX 115*c* and the PWM updown counter 115*a*, a control signal for controlling the DUTY of the PWM signal output from the PWM signal output terminal 115*i*.

The MUX 115*c* is electrically connected to the PWM updown counter 115*a* and the digital comparator 115*b*, and controls the DUTY of the PWM signal output from the PWM signal output terminal 115*i*, by increasing or decreasing the counting performed by the PWM updown counter 115*a*. Also, the MUX 115*c* is electrically connected to the register 114, and controls the counting of the PWM updown counter 115*a*, based on the value of the SLOPW register of the register 114.

How the PWM updown counter 115*a*, digital comparator 115*b*, and MUX 115*c* operate will be discussed later.

First, an operation in case where the automatic light control mode is switched off will be described.

When the PWM controller 115 of the present embodiment is activated, the PWM updown counter 115*a* outputs a 10-bit digital signal, which is set as an initial value, to the delay circuit 115*f* and the digital comparator 115*b*. This 10-bit digital signal as the initial value may be an initial value which is supplied to the input terminal of the PWM updown counter 115*a* as discussed above, or may be a value which is used when the automatic light control mode is switched off. Alternatively, the initial value may be a constant such as "0000000000". These values may be set by a value on a preset value loading terminal 115*a*1 of the PWM updown counter 115*a*.

In the PWM updown counter 115*a* of the present embodiment, the data of DUTY (7:0) register which is used when the automatic light control is switched off is input when the signal supplied to the preset value loading terminal 115*a*1 is at High level, and an initial value corresponding to the data of the DUTY register is loaded into the PWM updown counter 115*a*. In doing so, the PWM updown counter 115*a* operates independently of the control signal which is used for the automatic light control by the digital comparator 115*b* and the MUX 115*c*.

In the present embodiment, since the data of the DUTY register is, for example, 8-bit data, the DUTY set by the DUTY (7:0) register is the upper 8 bits and the lower 2 bits are set at "00" so that the data is converted into a 10-bit value, for example. The conversion to a 10-bit value may be performed in another way, or a 10-bit value which has been set as an initial value in the PWM updown counter 115*a* may be used.

The following will discuss an operation when the automatic light control mode is switched on.

When the automatic light control mode is switched on, a signal input to the preset value loading terminal 115*a*1 is at Low level. In this case, the initial value of the 10-bit digital signal output from the PWM updown counter 115*a* may be an initial value supplied to the input terminal of the PWM updown counter 115*a* as described above, or may be a value which is used when the automatic light control mode is switched off. Alternatively, the initial value may be a constant such as "0000000000".

The 10-bit digital signal output from the PWM updown counter 115*a* is supplied to the delay circuit 115*f* and the digital comparator 115*b*. The delay circuit 115*f* generates and outputs the PWM signal in accordance with the 10-bit digital signal, as described above.

In the digital comparator 115*b*, (1) an 8-bit DUTY corresponding to a current illuminance level is supplied from the register 114 to the DUTY setting value input terminal 115*b*1, and (2) the 10-bit digital signal is supplied from the PWM updown counter 115*a* to the DUTY current value input terminal 115*b*2.

With reference to the illuminance data stored in the ADO register, the DUTY input from the register 114 is set by one of the registers OPT0-OPT15, which has been selected by the aforementioned method shown in FIG. 8, and the DUTY of the selected register is supplied to the DUTY setting value input terminal 115*b*1. Since each of these sets of DUTY is at 8 bits, the sets of the DUTY set by the registers OPT0-OPT15 are upper 8 bits, and the lower 2 bits are set at "00". In this way, conversion to a 10-bit value is achieved. This conversion to a 10-bit value may be performed by another well-known method.

The digital comparator 115*b* then compares (i) data (data C) which has been supplied to the DUTY setting value input terminal 115*b*1 and has been converted to a 10-bit value with (ii) a 10-bit digital signal (data D) which has been supplied to the DUTY current value input terminal 115*b*2.

The digital comparator 115*b* has output terminals GO, ZO, and SO. As a result of the comparison above, the digital comparator 115*b* (i) outputs High level at GO and Low level at ZO and SO when the data C is larger than the data D, (ii) outputs High level at ZO and Low level at GO and SO when the data C is equal to the data D, and (iii) outputs High level at SO and Low level at GO and ZO when the data D is larger than the data C.

The terminal GO is electrically connected to a terminal 115*c*_c0 of the MUX 115*c*. The terminal ZO is electrically connected to a terminal 115*c*_c1 of the MUX 115*c*. The terminal SO is electrically connected to a terminal 115*a*_U/D of the PWM updown counter 115*a*. The terminal 115*a*_U/D is an input terminal to which a signal for increasing or decreasing the counting of the PWM updown counter 115*a* is supplied. The PWM updown counter 115*a* counts up when a High level signal is input to the terminal 115*a*_U/D. The PWM updown counter 115*a* counts down when a Low level signal is input to the terminal 115*a*_U/D.

The MUX 115*c* has input terminals a0, a1, a2, and a3. The terminal a0 is connected to a Duty_Down_CLK which is used when the DUTY of the PWM signal is decreased. The terminal a2 is connected to a Duty_Up_CLK which is used when the DUTY of the PWM signal is increased. The terminals a1 and a3 are electrically grounded.

Furthermore, the MUX 115*c* is electrically connected to a terminal 115*a*_CK of the PWM updown counter 115*a*, and outputs, to the terminal 115*a*_CK, a signal input to one of the input terminals a0 to a2.

The operation of the MUX 115*c* is illustrated in Table 2.

TABLE 2

| 115c_c0 | 115c_c1 | Terminal connected to 115a_CK |
|---|---|---|
| Low | Low | a0 |
| Low | High | a1 |
| High | Low | a2 |
| High | High | a3 |

In response to signals input to the terminals 115*c*_c0 and 115*c*_c1, the MUX 115*c* of the present embodiment outputs, to the terminal 115*a*_CK, a signal which has been input to one of the input terminals a0-a2, as shown in Table 2.

Therefore, the 10-bit signal output from the PWM updown counter 115*a* is updated as below.

First, if data C>data D, i.e. if the DUTY read out from the register 114 is smaller than the DUTY currently output from the PWM signal output terminal 115*i*, the signal on the terminal GO is at High level.

At this point, the signal on the terminal 115*c*_c0 is at High level and the signal on the terminal 115*c*_c1 is at Low level. Therefore the MUX 115*c* selects the terminal a2 as shown in Table 2. The Duty_Down_CLK is then output to the terminal 115*a*_CK of the PWM updown counter 115*a*.

Furthermore, since the signal on the terminal SO is at Low level, the signal on the terminal 115*a*_U/D is at Low level and hence the PWM updown counter 115*a* counts down.

As discussed above, the PWM updown counter 115*a* is electrically connected to the SLOPE register of the register 114, and counts down in accordance with the time variation ratio which has been set by the DWSL register and in accordance with the clock of the Duty_Down_CLK.

This counting down continues in accordance with the clock of the Duty_Down_CLK, until the data C becomes equal to the data D.

When the data C becomes equal to the data D, the signal on the terminal ZO is switched to High level and the signal on the terminal 115*c*_c1 is switched to High level. In this case, the MUX 115*c* selects the terminal a1 or a3 in accordance with the signal on the terminal 115*c*_c0, as shown in Table 2. As shown in FIG. 11, the terminals a1 and a3 are electrically grounded. On this account, the clock having been supplied to the 115*a*_CK of the PWM updown counter 115*a* stops. Therefore, the update of the counting of the PWM updown counter 115*a* stops when the DUTY read out from the register 114 becomes equal to the DUTY currently output from the PWM signal output terminal 115*i*.

Similarly, if data C<data D, i.e. if the DUTY read out from the register 114 is larger than the DUTY currently output from the PWM signal output terminal 115*i*, the signals on the terminals GO and ZO are at Low level.

At this point, the signal on the terminal 115*c*_c0 is at Low level and the signal on the terminal 115*c*_c1 is at Low level. The MUX 115*c* therefore selects the terminal a0 as shown in Table 2, and the Duty_Up_CLK is output to the terminal 115*a*_CK of the PWM updown counter 115*a*.

Furthermore, since the signal on the terminal SO is at High level, the signal on the terminal 115*a*_U/D is at High level and hence the PWM updown counter 115*a* counts up.

As discussed above, the PWM updown counter 115*a* is electrically connected to the SLOPE register of the register 114, and counts down in accordance with the time variation ratio which has been set by the UPSL register and in accordance with the clock of the Duty_Up_CLK.

The count down continues in accordance with the clock of the Duty_Up_CLK, until the data C becomes equal to the data D.

When the data C becomes equal to the data D, the signal on the terminal ZO is switched to High level and the signal on the terminal 115_c_1 is switched to High level. In this case, the MUX 115_c_ selects the terminal a1 or a3 in accordance with the signal on the terminal 115_c0, as shown in Table 2. As shown in FIG. 11, the terminals a1 and a3 are electrically grounded. On this account, the clock having been supplied to the terminal 115_a_CK of the PWM updown counter 115_a_ stops. Therefore, the update of the counting of the PWM updown counter 115_a_ stops when the DUTY read out from the register 114 becomes equal to the DUTY currently output from the PWM signal output terminal 115_i_.

With the arrangement above, the DUTY output from the PWM signal output terminal 115_i_ does not rapidly change even if the illuminance level rapidly changes as shown in FIG. 10, and the DUTY is controlled in the range of 0% to 100% in 1024 grayscales (0.0977% per step). It is therefore possible to achieve smooth automatic light control of the backlight or the like.

Figure 13:
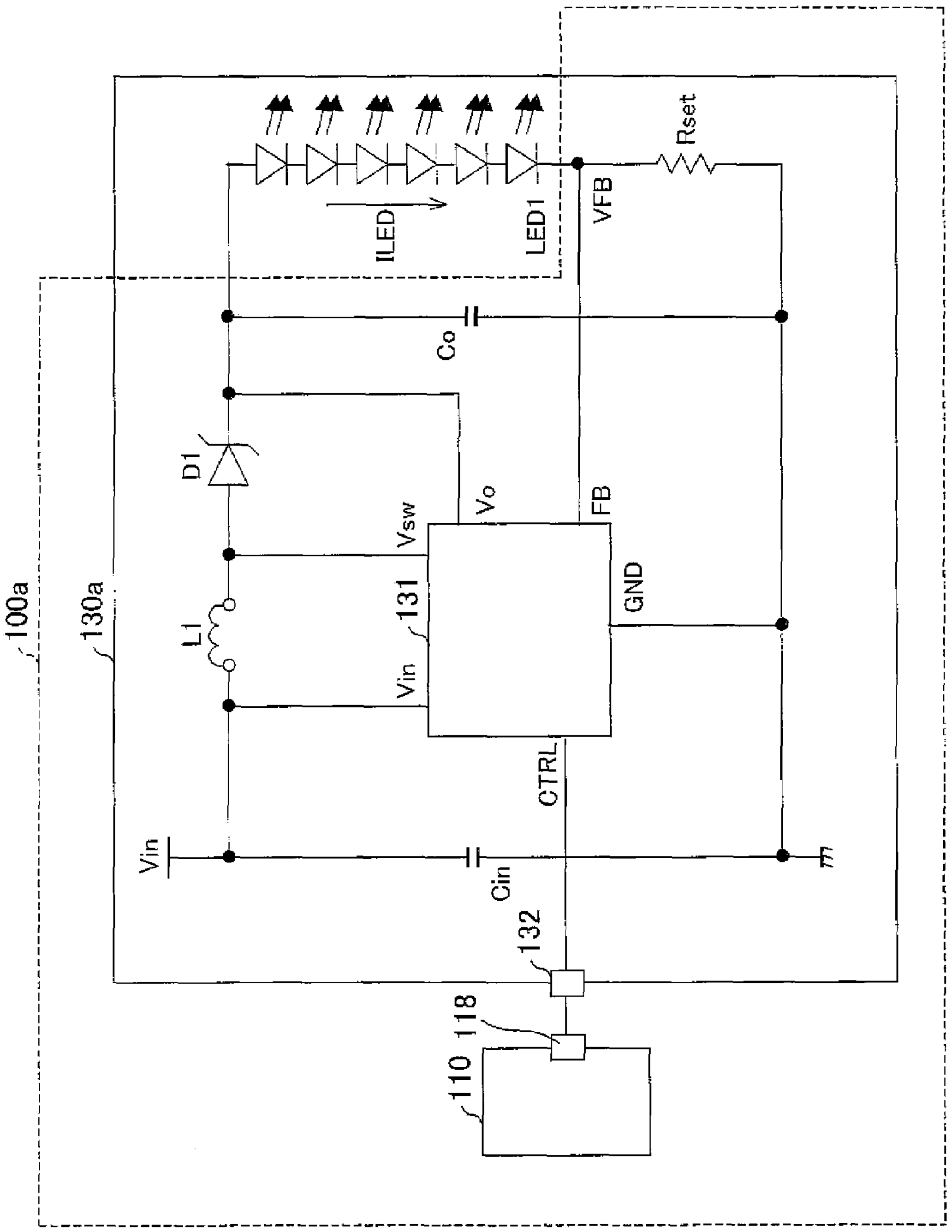
FIG. 13 is a block diagram which relates to the embodiment of the light control apparatus of the present invention, and which shows the general-purpose LED driver of FIG. 2.

FIG. 13 shows an example of the light control apparatus of the present embodiment, and is a block diagram showing a light control apparatus 100_a_ which adopts the aforesaid illuminance sensor 110 and a coil-type step-up LED driver 130_a_.

The coil-type step-up LED driver 130_a_ of the present embodiment may be used as, for example, an LED automatic backlight control system.

The coil-type step-up LED driver 130_a_ of the present embodiment includes a coil-type step-up section 131, a coil L1, a Schottky diode D1, a capacitor Cin, a capacitor Co, and a resistor Rset.

The coil-type step-up section 131 has terminals Vin, Vsw, Vo, FB, CTRL, and GND. The terminal Vin is electrically connected to the voltage source Vin and to one terminal of the coil L1. The terminal Vsw is electrically connected to the other terminal of the coil L1 and to the anode terminal of the Schottky diode D1. The terminal Vo is electrically connected to the cathode terminal of the Schottky diode D1 and to the anode terminal of a light-emitting diode LED1 which is driven by the coil-type step-up LED driver 130_a_ of the present embodiment. The terminal FB is electrically connected to the cathode terminal of the light-emitting diode LED1 and to one terminal of the resistor Rset. The other terminal of the Rset is electrically grounded. The terminal CTRL is electrically connected to the PWM modulation terminal 132. This PWM modulation terminal 132 is electrically connected to the PWM output terminal 118 of the illuminance sensor 110. The terminal GND is electrically grounded. One terminal of the capacitor Cin is electrically connected to the voltage source Vin, whereas the other terminal is electrically grounded. One terminal of the capacitor Co is electrically connected to the cathode terminal of the Schottky diode D1, whereas the other terminal is electrically grounded.

In the coil-type step-up LED driver 130_a_ of the present embodiment, the input voltage Vin is switched by the terminal Vsw so that a voltage higher than the voltage Vin is generated in the coil L1. The boosted voltage is smoothed by the capacitor Co.

The Schottky diode D1 allows a current to flow only in one direction. Therefore the voltage on the anode terminal of the LED 1 to be driven is higher than the voltage Vin.

The current flowing in the LED1 is determined by the resistor Rset. In the coil-type step-up LED driver 130_a_ of the present embodiment, the Vsw terminal is switched by a control circuit which monitors the FB terminal voltage VFB so as to control the frequency of the switching, and feedback is: performed, in such a manner as to keep the voltage on the both ends of the resistor Rset at a constant voltage VFB.

The terminal Vo is used for detecting an overvoltage. A protection circuit (not illustrated), which is included in the coil-type step-up section 131, is arranged to operate when the boosted voltage becomes higher than a predetermined voltage. The protection circuit has a function to stop the switching performed by the coil-type step-up section 131, so as to stop the boosting performed by the coil-type step-up LED driver 130_a_.

The terminal CTRL has a function to switch on/off the current supplied to the LED1. In the coil-type step-up section 131 of the present embodiment, the LEDs are switched on when the signal on the terminal CTRL is at High level, whereas the LEDs are switched off when the signal on the terminal CTRL is at Low level. Therefore, the PWM signal is supplied from the illuminance sensor 110 to the terminal CTRL so that the LED1 is repeatedly switched on and off. The illuminance of the LED 1 is therefore low when the DUTY of the PWM signal is small, whereas the illuminance of the LED1 is high when the DUTY is large.

In other words, in case where an LED automatic backlight control system is constituted by the light control apparatus 10_a_ of the present embodiment, the LED, backlight is dark when the DUTY is small, whereas the LED backlight is bright when the DUTY is large. It is therefore possible to automatically control the light emitted from the LED backlight, in accordance with the illuminance.

Figure 14:
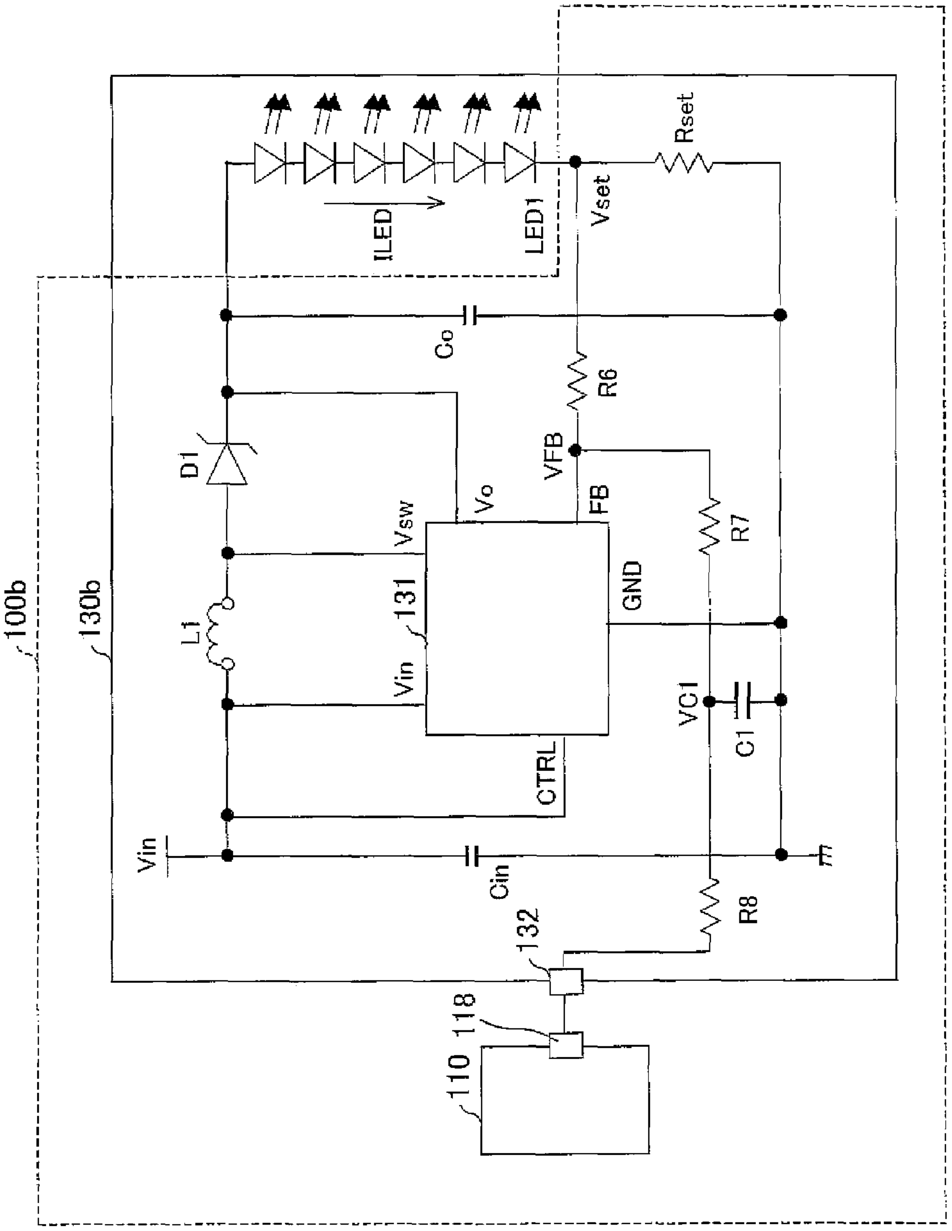
FIG. 14 is a block diagram which relates to the embodiment of the light control apparatus of the present invention, and which shows another arrangement of the general-purpose LED driver of FIG. 2.
Figure 15:
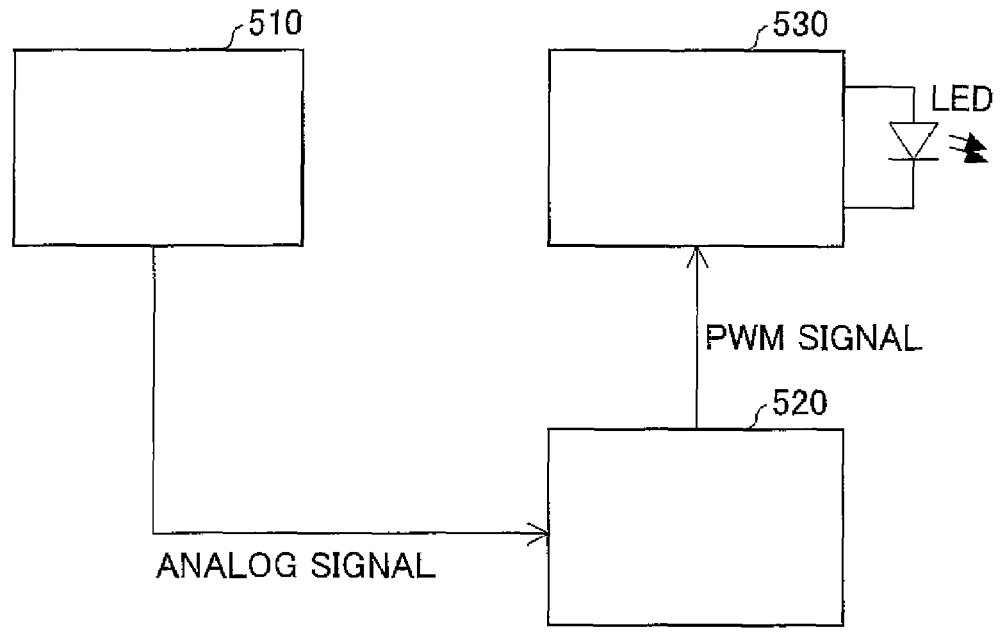
FIG. 15 (PRIOR ART)
FIG. 15 is a block diagram showing a conventional light control apparatus.
Figure 16:
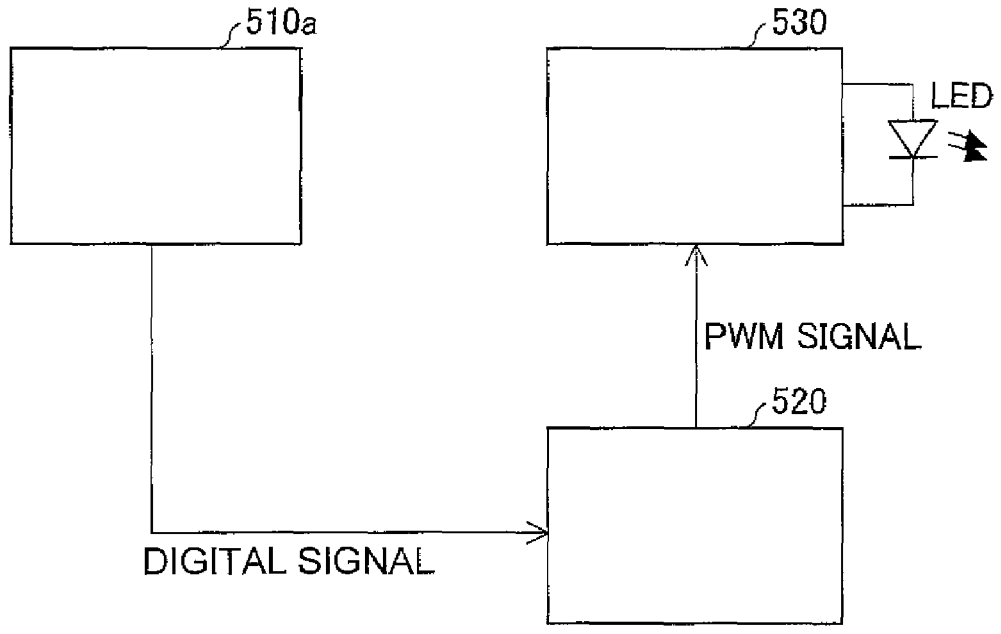
FIG. 16 (PRIOR ART)
FIG. 16 is a block diagram showing another arrangement of the conventional light control apparatus.
Figure 17:
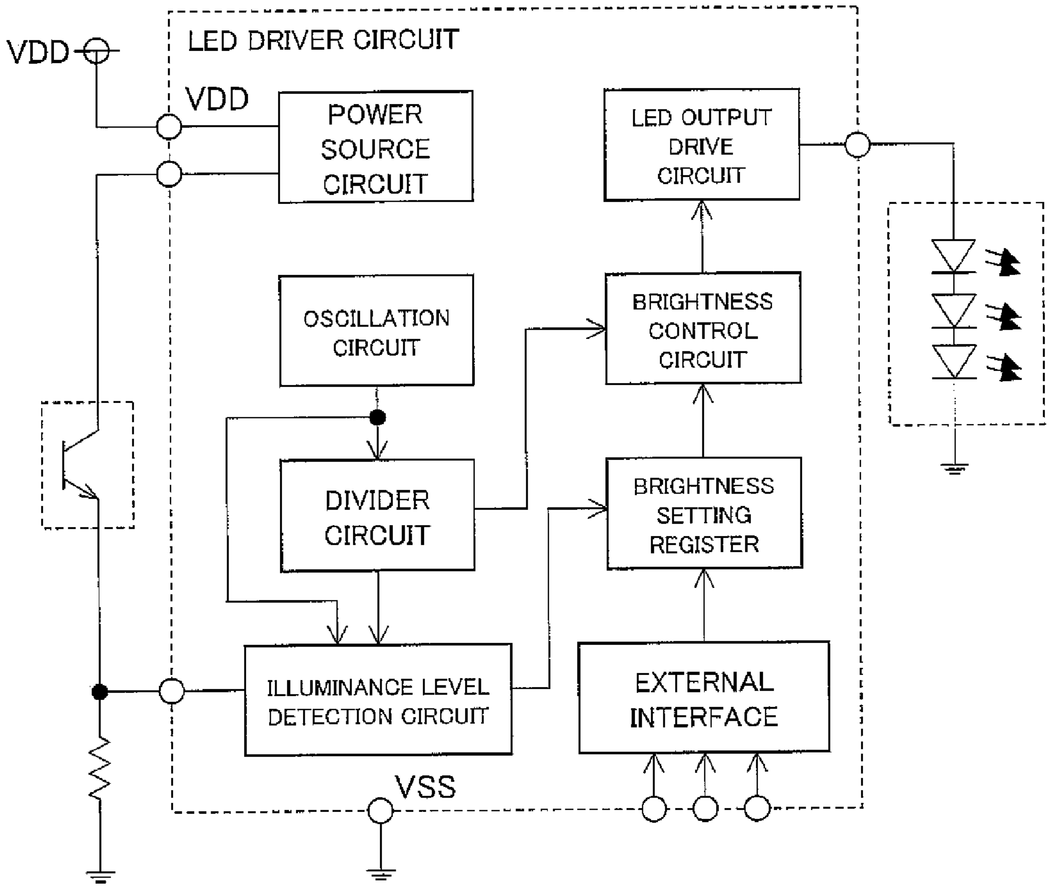
FIG. 17 (PRIOR ART)
FIG. 17 is a block diagram showing another arrangement of the conventional light control apparatus.
Figure 18:
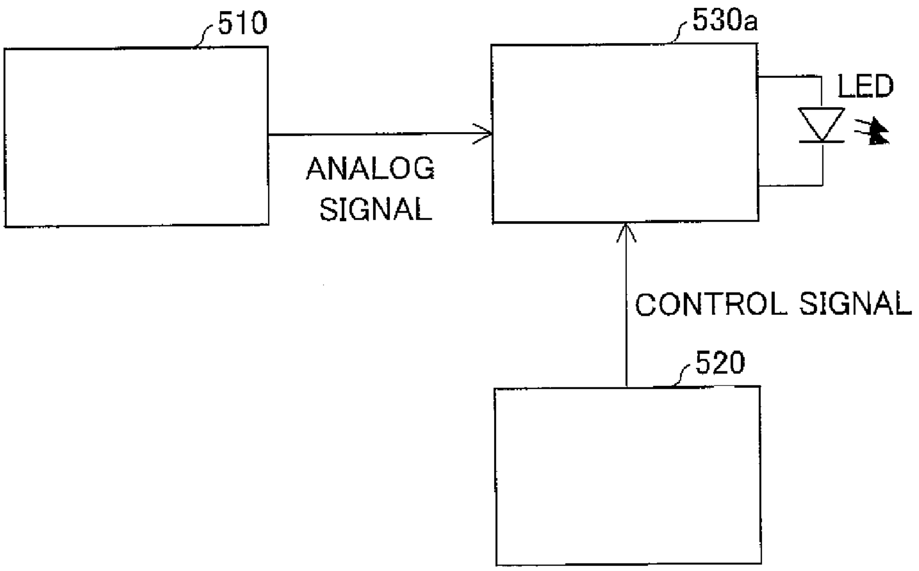
FIG. 18 (PRIOR ART)
FIG. 18 is a block diagram showing another arrangement of the conventional light control apparatus.

FIG. 14 shows a light control apparatus of another embodiment of the present invention, and is a block diagram showing a light control apparatus 100_b_ adopting a coil-type step-up LED driver 130_b_.

The coil-type step-up LED driver 130_b_ of the present embodiment includes resistors R6, R7, and R8 and a capacitor C1, in addition to the members constituting the coil-type step-up LED driver 130_a_.

In the coil-type step-up LED driver 130_b_ of the present embodiment, the terminal CTRL of the coil-type step-up section 131 is not electrically connected to the PWM modulation terminal 132 but is electrically connected to the voltage source Vin. Also, to the terminal FB and the cathode terminal of the LED1 driven by the coil-type step-up LED driver 130_b_ of the present embodiment, the resistor R6 is electrically connected. The terminal FB is also electrically connected to one terminal of the resistor R7. The other terminal of the resistor R7 is connected to one terminal of the capacitor C1 and to one terminal of the resistor R8. The other terminal of the capacitor C1 is electrically grounded. The other terminal of the resistor R8 is electrically connected to the PWM modulation terminal 132.

In the coil-type step-up LED driver 130_b_ of the present embodiment, the resistor R8 and the capacitor C1 function as an RC filter for smoothing the rectangular wave of the PWM signal output from the illuminance sensor 110. A voltage VC1 between the terminals of the capacitor C1 after passing through the RC filter is in proportion to the DUTY of the PWM signal.

Provided that the voltage on the cathode terminal of the LED1 driven by the coil-type step-up LED driver 130_b_ of the present embodiment is Vset, a current ILED flowing in the LED1 is represented as follows.

$$ILED = Vset/Rset$$

Provided that the amplitude of the voltage of the PWM signal is Vs and the DUTY is D, the following equation holds true.

$$Vset = VFB + (R1/R2)\times(VFB - VC1)$$

Since the voltage VC1 is approximate to (R2/(R2+R3))×Vs×D, the following expression holds true.

$$Vset \approx VFB + (R1/R2)\times(VFB - (R2/(R2+R3))\times Vs\times D)$$

In the light control apparatus 100*b* of the present embodiment, the illuminance of the LED1 is high when the DUTY of the PWM signal is small, whereas the illuminance of the LED 1 is low when the DUTY is large. The illuminance of the LED1 decreases in inverse proportion to the DUTY. Therefore, in case where a LED automatic backlight control system is constituted by the light control apparatus 100*b* of the present embodiment, the LED backlight is bright when the DUTY is small, whereas the LED backlight is dark when the DUTY is large. It is therefore possible to automatically control the light emitted from the LED backlight, in accordance with the illuminance.

As discussed above, the light control apparatus of the present invention is arranged such that the illuminance sensor includes the photodiode and the signal processing circuit. The illuminance sensor therefore outputs a PWM signal corresponding to ambient brightness, and hence the PWM signal can be directly supplied to the PWM modulation terminal of the LED driver, without requiring the intervention of a microcomputer (CPU). It is therefore possible to construct a light control apparatus such as an automatic backlight control system, only by combining the illuminance sensor of the present invention with a general-purpose LED driver.

The photodiode and the signal processing circuit may be integrated on a single silicon chip, as an OPIC. Since this makes it possible to shorten the length of a line through which a minute photodiode photocurrent flows at the time of low illuminance, it is possible to construct a light control apparatus such as an illuminance sensor for automatic backlight control, which is not susceptible to disturbance noise.

In the light control apparatus of the present invention, the CPU is only required to perform the initial setting of the PWM output illuminance sensor at the time of power on, and hence the CPU is not required to always monitor the illuminance. It is therefore possible to prevent the deterioration of the performance of the CPU.

Almost all types of general-purpose LED drivers and cold-cathode tube drivers can control the brightness by a PWM signal. Therefore the light control apparatus of the present invention makes it possible to realize an automatic light control system which is low-cost, excels in versatility, and is free from the deterioration of the performance of the CPU.

The present invention is not limited to the description of the embodiments above, but may be altered by a skilled person within the scope of the claims.

[Sum-Up of Embodiment]

To achieve the objective above, an illuminance sensor 110 of the present embodiment includes: a light receiving element 111 which outputs an electric signal corresponding to ambient brightness; an A/D converter 113 which converts the electric signal output from the light receiving element 111 into a digital signal; an ADO register ADO which stores the digital signal output from the A/D converter 113; OPT registers OPT0-OPT15 which store duty ratios which are output based on the value of the ADO register ADO; a register 114 which determines the duty ratio of the PWM signal based on the digital signal output from the A/D converter 113; and a PWM controller 115 which outputs the PWM signal based on the duty ratio output from the register 114.

To achieve the objective above, each of the light control apparatus 100, 100*a*, and 100*b* of the present embodiment is preferably provided with the illuminance sensor 110.

In this arrangement, the illuminance sensor 110 of the present embodiment is arranged such that the A/D converter 113 outputs a digital signal in accordance with the ambient brightness detected by the light receiving element 111. The duty ratio is determined based on the digital signal, and the duty ratio is output as a PWM signal.

It is therefore possible to construct a light control apparatus such as an automatic backlight control system only by combining the illuminance sensor 110 with a general-purpose LED driver or the likes.

In addition to the above, a single semiconductor device may be constructed by integrating the light receiving element 111, the A/D converter 113, the register 114, and the PWM controller 115.

With this arrangement, a minute signal output from the light receiving element 111 electrically travels in a short distance, and hence an influence of external noise is reduced.

It is therefore possible to restrain an influence of external noise in the processes until the generation of the PWM signal.

The following members may be provided: a voltage source of the reference current Iref whose temperature characteristics are identical with those of the light receiving element 111; a logarithmic compression amplifier AMP1 which logarithmic-compresses an electric signal output from the light receiving element 111 and outputs the electric signal as a voltage; a logarithmic compression amplifier AMP2 which logarithmic-compresses the electric signal output from the current source of the reference current Iref and outputs the electric signal as a voltage; an adder-subtracter circuit. AMP3 which outputs, as an analog signal, a potential difference between the outputs of the logarithmic compression amplifier AMP1 and the logarithmic compression amplifier AMP2; a D/A converter 113*b* which is included in the A/D converter 113 and reconverts the digital signal output from the A/D converter 113 into an analog signal; and a comparator COMP1 which compares (i) the magnitude of an analog signal output from the adder-subtracter circuit AMP3 with (ii) the magnitude of the analog signal output from the D/A converter 113*b* which is included in the A/D converter 113 and reconverts the digital signal output from the A/D converter 113 into an analog signal, and outputs a digital signal control signal for controlling the digital signal which is output from the A/D converter 113 in such a manner as to equalize the aforesaid analog signals. Also, the A/D converter 113 may increase or decrease the value of the digital signal based on the digital signal control signal.

In the arrangement above, since the difference is figured out after the electric signals output from the light receiving element 111 and the current source of the reference current Iref, which have the same temperature characteristics, are logarithmic-compressed, it is possible to remove an influence of the inverted saturation current (Is) which is included in the electric signals output from the light receiving element 111 and the current source and relates to PN-junction of a transistor or a diode for the logarithmic compression.

Furthermore, the digital signal output from the A/D converter 113 is re-converted into an analog signal by the D/A converter 113*b*, and a comparison thereof is performed by the comparator COMP1. The comparator COMP1 outputs a digital signal control signal to the A/D converter 113 in such a matter as to equalize the supplied plural analog signals.

Therefore, the analog signal from the adder-subtracter circuit AMP3, which is in proportion to the thermal voltage Vt, is converted to a digital signal, as a difference of the analog signals as discussed above. Therefore the signal is free from an influence of, for example, a potential variation of the thermal voltage Vt and a voltage source which is used for operating the illuminance sensor 110 of the present embodiment.

The register 114 may further be provided with a serial interface 117, and the serial interface 117 may input the duty ratio from a CPU 120 provided outside the illuminance sensor 110 to the OPT registers OPT0-OPT15.

In this embodiment, the duty ratio of the PWM signal can be input from the outside of the illuminance sensor 110 of the present embodiment. It is therefore possible to suitable update the relations between the ambient brightness detected by the light receiving element 111 and the duty ratio.

Also, it may be arranged such that the register 114 is further provided with a SLOPE register SLOPE, this SLOPE register SLOPE stores different time variation ratios which are used when the duty ratio increases and when the duty ratio decreases, respectively, and, when the duty ratio increases or decreases, the PWM controller 115 varies the duty ratio of the PWM signal over time and outputs the same, in accordance with the corresponding time variation ratio stored in the SLOPE register SLOPE.

When the brightness of the backlight or the like rapidly changes on account of a rapid change of the illuminance, human eyes may experience discomfort due to flicker in the screen or the like.

Human eyes have characteristics such that, the time for adaptation to a bright place (light adaptation time), when he/she suddenly comes out from a dark place to a bright place, is short, whereas the time for adaptation to a dark place (dart adaptation time), when he/she suddenly enters a dark place from a bright place, is long.

In the arrangement above, the time variation ratio of the variation of the duty ratio of the PWM signal output is set for each of the cases where the illuminance varies from low (dark) to high (bright) and the illuminance varies from high (bright) to low (dark). With this, it is possible to prevent discomfort due to flicker in the screen or the like, which occurs when the duty ratio is changed.

The time variation ratio of the duty ratio may be set so as to be not higher than 1/400 (0.25%).

This arrangement makes variations in the brightness by automatic light control appear smooth.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An illuminance sensor, comprising:

light receiving means for outputting an electric signal corresponding to ambient brightness;

A/D conversion means for converting the electric signal output from the light receiving means into a digital signal;

duty ratio determination means including: an illuminance register storing the digital signal output from the A/D conversion means; and duty ratio registers each storing a duty ratio which is output based on a value of the illuminance register, the duty ratio determination means determining the duty ratio of a PWM signal based on the digital signal output from the A/D conversion means; and PWM signal output means for outputting the PWM signal based on the duty ratio output from the duty ratio determination means, the illuminance sensor further comprising:

(a) light receiving signal logarithmic compression means for logarithmic-compressing the electric signal which is output from the light receiving means and outputting the electric signal as a voltage;

(b) temperature compensation means having same temperature characteristic as the light receiving means;

(c) temperature correction signal logarithmic compression means for logarithmic-compressing the electric signal which is output from the temperature compensation means and outputting the electric signal as a voltage;

(f) offset voltage output means for outputting an offset voltage which is a sum of a reference voltage and a voltage calculated by multiplying a thermal voltage by a constant; and (g) potential difference output means for outputting, as an analog signal, a difference between (i) a voltage which is a sum of a voltage outputted by the temperature correction signal logarithmic compression means and the offset voltage outputted by the offset voltage output means and (ii) a voltage outputted by the light receiving signal logarithmic compression means, the A/D conversion means including:

(d) D/A conversion means being included in the A/D conversion means and re-converting the digital signal which is output from the A/D conversion means into an analog signal;

(e) analog signal comparison means for comparing (i) a magnitude of the analog signal which is output from the potential difference output means with (ii) a magnitude of the analog signal which is output from the D/A conversion means being included in the A/D conversion means and re-converting the digital signal which is output from the A/D conversion means into an analog signal, and outputting a digital signal control signal for controlling the digital signal output from the A/D conversion means in such a way as to equalize the magnitudes of the analog signals; and (h1) an illuminance level updown counter for increasing or decreasing a value of the digital signal which is output therefrom, based on the digital signal control signal (i) which is output from the analog signal conversion means, and (h2) converting the digital signal into a digital signal which is output from the A/D conversion means;

(i) the analog signal which is output from the D/A conversion means being a sum of the reference voltage and a voltage calculated by multiplying the thermal voltage by a variable.

2. The illuminance sensor as defined in claim 1, wherein, the constant is set in accordance with the following equation:

$$A-\ln(Iref/Ipd\_1lx)=0$$

where A is the constant; Iref is the electric signal which is output from the temperature compensation means; and Ipd_1lx is a photocurrent flowing in a photodiode which is the light receiving means when the illuminance is 1 lux.

3. The illuminance sensor as defined in 2, wherein, the variable is calculated in accordance with the following equation:

$$B=2.3025\times\log(Ev)$$

where B is the variable and Ev is illuminance measured by the light receiving means.

4. A light control apparatus, comprising the illuminance sensor defined in claim 1.

5. A light control apparatus, comprising the illuminance sensor defined in claim 2.

6. A light control apparatus, comprising the illuminance sensor defined in claim 3.

7. An illuminance sensor, comprising:

light receiving means for outputting an electric signal corresponding to ambient brightness;

A/D) conversion means for converting the electric signal output from the light receiving means into a digital signal;

duty ratio determination means including: an illuminance register storing the digital signal output from the A/D conversion means; and duty ratio registers each storing a duty ratio which is output based on a value of the illuminance register, the duty ratio determination means determining the duty ratio of a PWM signal based on the digital signal output from the A/D conversion means;

PWM signal output means for outputting the PWM signal based on the duty ratio output from the duty ratio determination means;

temperature compensation means having same temperature characteristics as the light receiving means;

light receiving signal logarithmic compression means for logarithmic-compressing the electric signal which is output from the light receiving means and outputting the electric signal as a voltage;

temperature correction signal logarithmic compression means for logarithmic-compressing the electric signal which is output from the temperature compensation means and outputting the electric signal as a voltage;

potential difference output means for outputting, as an analog signal, a difference between electric potentials output which are from the light receiving signal logarithmic compression means and the temperature correction signal logarithmic compression means, respectively;

D/A conversion means being included in the A/D conversion means and re-converting the digital signal which is output from the A/D conversion means into an analog signal; and analog signal comparison means for comparing (i) a magnitude of the analog signal which is output from the potential difference output means with (ii) a magnitude of the analog signal which is output from the D/A conversion means, and outputting a digital signal control signal for controlling the digital signal output from the A/D conversion means in such a way as to equalize the magnitudes of the analog signals, the A/D conversion means increasing or decreasing a value of the digital signal which is output therefrom, based on the digital signal control signal.

8. The illuminance sensor as defined in claim 7, wherein, the duty ratio determination means further includes a duty ratio variation speed adjustment register, the duty ratio variation speed adjustment register stores a time variation ratio for a case where the duty ratio increases and another time variation ratio for a ease where the duty ratio decreases, and when the duty ratio increases or decreases, the PWM signal output means varies the duty ratio of the PWM signal over time, based on the corresponding time variation ratio stored in the duty ratio variation speed adjustment register.

9. The illuminance sensor as defined in claim 8, wherein, the time variation ratios of the duty ratio are set so as to be lower than 1/400.

10. A light control apparatus, comprising the illuminance sensor defined in claim 7.

11. A light control apparatus, comprising the illuminance sensor defined in claim 8.

12. A light control apparatus, comprising the illuminance sensor defined in claim 9.

* * * * *